US012804486B2

(12) United States Patent
Purkayastha et al.

(10) Patent No.: US 12,804,486 B2
(45) Date of Patent: Nov. 17, 2026

(54) LOWER LAYER SIGNALING FOR SECONDARY CELL GROUP SELECTIVE ACTIVATION

(71) Applicant: QUALCOMM Incorporated, San Diego, CA (US)

(72) Inventors: Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 18/506,826

(22) Filed: Nov. 10, 2023

(65) Prior Publication Data

US 2024/0163750 A1 May 16, 2024

Related U.S. Application Data

(60) Provisional application No. 63/383,678, filed on Nov. 14, 2022.

(51) Int. Cl.
*H04W 36/00* (2009.01)

(52) U.S. Cl.
CPC . *H04W 36/00837* (2018.08); *H04W 36/0058* (2018.08); *H04W 36/00835* (2018.08)

(58) Field of Classification Search
CPC ..... H04W 36/00; H04W 36/04; H04W 36/08; H04W 36/30; H04W 36/36; H04W 36/38;
(Continued)

(56) References Cited

U.S. PATENT DOCUMENTS 11,924,700 B2 * 3/2024 Zhang ............... H04W 36/0005
12,323,817 B2 * 6/2025 Da Silva .............. H04W 16/18
(Continued)

FOREIGN PATENT DOCUMENTS

WO 2021066700 A1 4/2021
WO 2022097046 A1 5/2022

OTHER PUBLICATIONS

International Search Report and Written Opinion—PCT/US2023/079502—ISA/EPO—Feb. 29, 2024.

*Primary Examiner* — Man U Phan
(74) *Attorney, Agent, or Firm* — Harrity & Harrity LLP/ QUALCOMM Incorporated

(57) ABSTRACT

Various aspects of the present disclosure generally relate to wireless communication. In some aspects, a user equipment (UE) may receive configuration information indicating, for each of multiple candidate target primary secondary cells (PSCells), a lower layer triggered PSCell addition or change configuration. The UE may transmit a measurement report indicating beam-level measurements and cell-level measurements associated with the multiple candidate target PSCells. The UE may receive, via lower layer signaling, a PSCell addition or change command indicating a candidate target PSCell, of the multiple candidate target PSCells, that is to be accessed. The UE may perform, based at least in part on receiving the PSCell addition or change command, a PSCell addition or change procedure associated with the candidate target PSCell based at least in part on a corresponding lower layer triggered PSCell addition or change configuration for the candidate target PSCell. Numerous other aspects are described.

30 Claims, 15 Drawing Sheets

(58) Field of Classification Search
CPC ..... H04W 76/15; H04W 76/19; H04W 76/20; H04W 72/04; H04W 72/12; H04W 72/21; H04W 52/14; H04W 52/24; H04W 24/02; H04W 24/10; H04W 56/00; H04L 27/00; H04L 5/00
USPC .......................................................... 370/331
See application file for complete search history.

(56) References Cited

U.S. PATENT DOCUMENTS

| | | | | |
|---|---|---|---|---|
| 12,396,051 | B2 * | 8/2025 | Kim | H04W 76/19 |
| 2021/0219199 | A1 | 7/2021 | Zhang et al. | |
| 2021/0258844 | A1 * | 8/2021 | Kim | H04W 36/305 |
| 2022/0264393 | A1 * | 8/2022 | Wang | H04W 24/02 |
| 2022/0322177 | A1 * | 10/2022 | Damnjanovic | H04W 36/0061 |
| 2023/0124607 | A1 * | 4/2023 | Hwang | H04L 5/0053 370/331 |
| 2024/0022973 | A1 * | 1/2024 | Ramachandra | H04W 36/0058 |
| 2024/0049076 | A1 * | 2/2024 | Jin | H04W 36/00835 |
| 2024/0056935 | A1 * | 2/2024 | Hwang | H04W 36/362 |
| 2024/0147317 | A1 * | 5/2024 | Xu | H04W 36/0061 |
| 2024/0276331 | A1 * | 8/2024 | Hwang | H04W 36/00692 |
| 2025/0267538 | A1 * | 8/2025 | Parichehrehteroujeni | H04W 36/32 |

* cited by examiner

LOWER LAYER SIGNALING FOR SECONDARY CELL GROUP SELECTIVE ACTIVATION

CROSS-REFERENCE TO RELATED APPLICATION

This patent application claims priority to U.S. Provisional Patent Application No. 63/383,678, filed on Nov. 14, 2022, entitled "LOWER LAYER SIGNALING FOR SECONDARY CELL GROUP SELECTIVE ACTIVATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for lower layer signaling for secondary cell group selective activation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information indicating, for each of multiple candidate target primary secondary cells (PSCells), a lower layer triggered PSCell addition or change configuration. The method may include transmitting a measurement report indicating beam-level measurements and cell-level measurements associated with the multiple candidate target PSCells. The method may include receiving, via lower layer signaling and based at least in part on a combination of the beam-level measurements and the cell-level measurements, a PSCell addition or change command indicating a candidate target PSCell, of the multiple candidate target PSCells, that is to be accessed. The method may include performing, based at least in part on receiving the PSCell addition or change command, a PSCell addition or change procedure associated with the candidate target PSCell based at least in part on a corresponding lower layer triggered PSCell addition or change configuration for the candidate target PSCell.

Some aspects described herein relate to a method of wireless communication performed by a network node. The method may include transmitting configuration information indicating, for each of multiple candidate target PSCells, a lower layer triggered PSCell addition or change configuration. The method may include receiving a measurement report indicating beam-level measurements and cell-level measurements associated with the multiple candidate target PSCells. The method may include identifying, based at least in part on a combination of the beam-level measurements and the cell-level measurements, that a UE is to perform a PSCell addition or change procedure. The method may include transmitting, via lower layer signaling, a PSCell addition or change command indicating a candidate target PSCell, of the multiple candidate target PSCells, that is to be accessed by the UE.

Some aspects described herein relate to a UE for wireless communication. The UE may include a transceiver, one or more memories, and one or more processors coupled to the transceiver and the one or more memories. The one or more processors may be configured to receive, via the transceiver, configuration information indicating, for each of multiple candidate target PSCells, a lower layer triggered PSCell addition or change configuration. The one or more processors may be configured to transmit, via the transceiver, a measurement report indicating beam-level measurements and cell-level measurements associated with the multiple candidate target PSCells. The one or more processors may be configured to receive, via the transceiver, via lower layer signaling, and based at least in part on a combination of the beam-level measurements and the cell-level measurements, a PSCell addition or change command indicating a candidate target PSCell, of the multiple candidate target PSCells, that is to be accessed. The one or more processors may be configured to perform, based at least in part on receiving the PSCell addition or change command, a PSCell addition or change procedure associated with the candidate target PSCell based at least in part on a corresponding lower layer triggered PSCell addition or change configuration for the candidate target PSCell.

Some aspects described herein relate to a network node for wireless communication. The network node may include one or more memories and one or more processors coupled to the one or more memories. The one or more processors may be configured to transmit configuration information indicating, for each of multiple candidate target PSCells, a lower layer triggered PSCell addition or change configuration. The one or more processors may be configured to receive a measurement report indicating beam-level measurements and cell-level measurements associated with the multiple candidate target PSCells. The one or more processors may be configured to identify, based at least in part on a combination of the beam-level measurements and the cell-level measurements, that a UE is to perform a PSCell addition or change procedure. The one or more processors may be configured to transmit, via lower layer signaling, a PSCell addition or change command indicating a candidate target PSCell, of the multiple candidate target PSCells, that is to be accessed by the UE.

Some aspects described herein relate to a non-transitory computer-readable medium that stores a set of instructions for wireless communication by a UE. The set of instructions, when executed by one or more processors of the UE, may cause the UE to receive configuration information indicating, for each of multiple candidate target PSCells, a lower layer triggered PSCell addition or change configuration. The set of instructions, when executed by one or more processors of the UE, may cause the UE to transmit a measurement report indicating beam-level measurements and cell-level measurements associated with the multiple candidate target PSCells. The set of instructions, when executed by one or more processors of the UE, may cause the UE to receive, via lower layer signaling and based at least in part on a combination of the beam-level measurements and the cell-level measurements, a PSCell addition or change command indicating a candidate target PSCell, of the multiple candidate target PSCells, that is to be accessed. The set of instructions, when executed by one or more processors of the UE, may cause the UE to perform, based at least in part on receiving the PSCell addition or change command, a PSCell addition or change procedure associated with the candidate target PSCell based at least in part on a corresponding lower layer triggered PSCell addition or change configuration for the candidate target PSCell.

Some aspects described herein relate to a non-transitory computer-readable medium that stores a set of instructions for wireless communication by a network node. The set of instructions, when executed by one or more processors of the network node, may cause the network node to transmit configuration information indicating, for each of multiple candidate target PSCells, a lower layer triggered PSCell addition or change configuration. The set of instructions, when executed by one or more processors of the network node, may cause the network node to receive a measurement report indicating beam-level measurements and cell-level measurements associated with the multiple candidate target PSCells. The set of instructions, when executed by one or more processors of the network node, may cause the network node to identify, based at least in part on a combination of the beam-level measurements and the cell-level measurements, that a UE is to perform a PSCell addition or change procedure. The set of instructions, when executed by one or more processors of the network node, may cause the network node to transmit, via lower layer signaling, a PSCell addition or change command indicating a candidate target PSCell, of the multiple candidate target PSCells, that is to be accessed by the UE.

Some aspects described herein relate to an apparatus for wireless communication. The apparatus may include means for receiving configuration information indicating, for each of multiple candidate target PSCells, a lower layer triggered PSCell addition or change configuration. The apparatus may include means for transmitting a measurement report indicating beam-level measurements and cell-level measurements associated with the multiple candidate target PSCells. The apparatus may include means for receiving, via lower layer signaling and based at least in part on a combination of the beam-level measurements and the cell-level measurements, a PSCell addition or change command indicating a candidate target PSCell, of the multiple candidate target PSCells, that is to be accessed. The apparatus may include means for performing, based at least in part on receiving the PSCell addition or change command, a PSCell addition or change procedure associated with the candidate target PSCell based at least in part on a corresponding lower layer triggered PSCell addition or change configuration for the candidate target PSCell.

Some aspects described herein relate to an apparatus for wireless communication. The apparatus may include means for transmitting configuration information indicating, for each of multiple candidate target PSCells, a lower layer triggered PSCell addition or change configuration. The apparatus may include means for receiving a measurement report indicating beam-level measurements and cell-level measurements associated with the multiple candidate target PSCells. The apparatus may include means for identifying, based at least in part on a combination of the beam-level measurements and the cell-level measurements, that a UE is to perform a PSCell addition or change procedure. The apparatus may include means for transmitting, via lower layer signaling, a PSCell addition or change command indicating a candidate target PSCell, of the multiple candidate target PSCells, that is to be accessed by the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
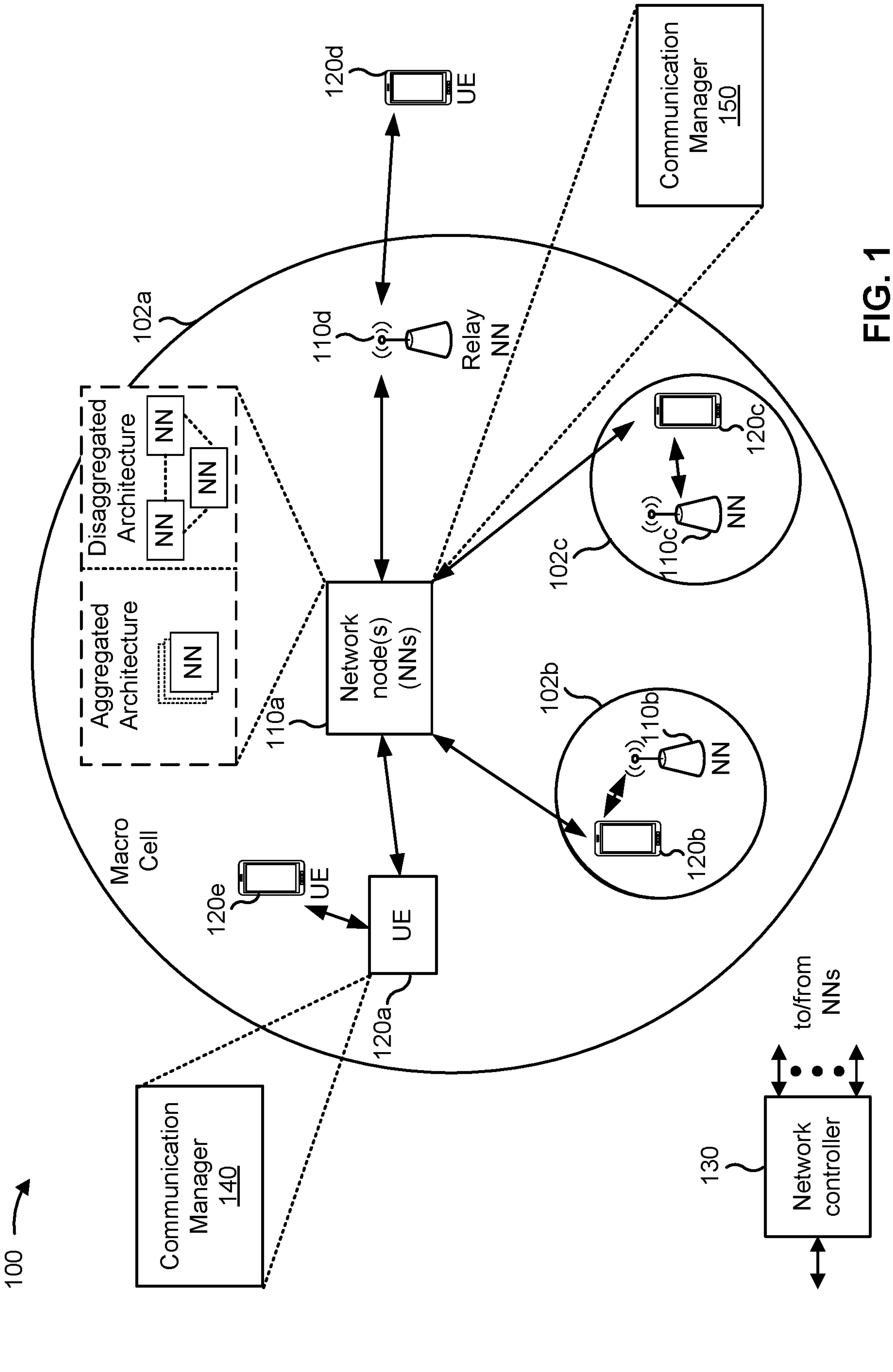
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more centralized units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term “cell” can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms “base station” or “network node” may refer to an aggregated base station, a disaggregated base station, an integrated access and backhaul (IAB) node, a relay node, or one or more components thereof. For example, in some aspects, “base station” or “network node” may refer to a CU, a DU, an RU, a Near-Real Time (Near-RT) RAN Intelligent Controller (RIC), or a Non-Real Time (Non-RT) RIC, or a combination thereof. In some aspects, the terms “base station” or “network node” may refer to one device configured to perform one or more functions, such as those described herein in connection with the network node 110. In some aspects, the terms “base station” or “network node” may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms “base station” or “network node” may refer to any one or more of those different devices. In some aspects, the terms “base station” or “network node” may refer to one or more virtual base stations or one or more virtual base station functions. For example, in some aspects, two or more base station functions may be instantiated on a single device. In some aspects, the terms “base station” or “network node” may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating, for each of multiple candidate target primary secondary cells (PSCells), a lower layer triggered PSCell addition or change configuration; transmit a measurement report indicating beam-level measurements and cell-level measurements associated with the multiple candidate target PSCells; receive, via lower layer signaling and based at least in part on a combination of the beam-level measurements and the cell-level measurements, a PSCell addition or change command indicating a candidate target PSCell, of the multiple candidate target PSCells, that is to be accessed; and perform, based at least in part on receiving the PSCell addition or change command, a PSCell addition or change procedure associated with the candidate target PSCell based at least in part on a corresponding lower layer triggered PSCell addition or change configuration for the candidate target PSCell. Additionally, or alternatively, the communication manager 140 may perform one or more other operations described herein.

In some aspects, the network node 110 may include a communication manager 150. As described in more detail elsewhere herein, the communication manager 150 may transmit configuration information indicating, for each of multiple candidate target PSCells, a lower layer triggered PSCell addition or change configuration; receive a measurement report indicating beam-level measurements and cell-level measurements associated with the multiple candidate target PSCells; identify, based at least in part on a combination of the beam-level measurements and the cell-level measurements, that a UE is to perform a PSCell addition or change procedure; and transmit, via lower layer signaling, a PSCell addition or change command indicating a candidate target PSCell, of the multiple candidate target PSCells, that is to be accessed by the UE. Additionally, or alternatively, the communication manager 150 may perform one or more other operations described herein.

As indicated above, FIG. 1 is provided as an example. Other examples may differ from what is described with regard to FIG. 1.

Figure 2:
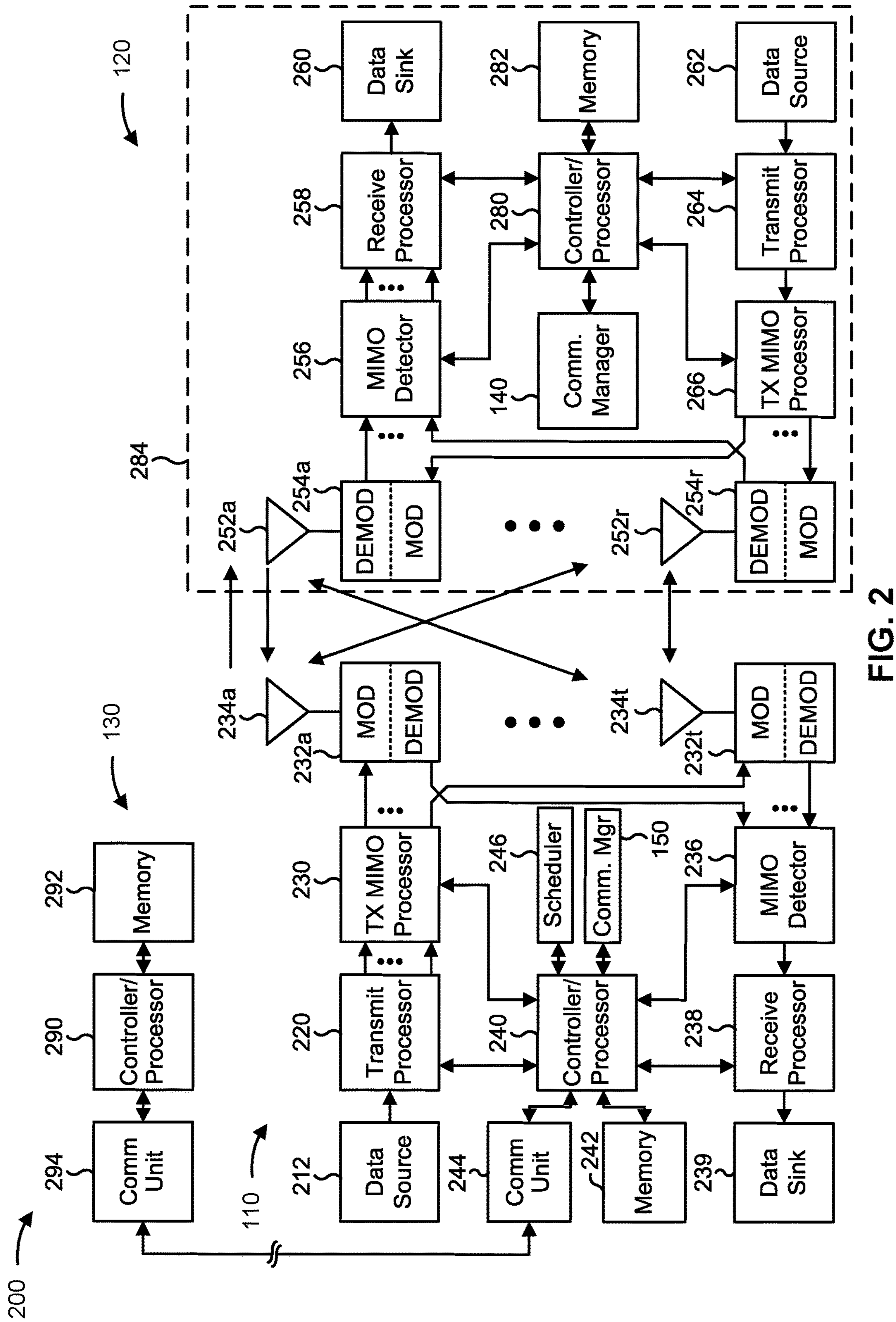
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234$a$ through 234$t$, such as T antennas (T≥1). The UE 120 may be equipped with a set of antennas 252$a$ through 252$r$, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232$a$ through 232$t$. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232$a$ through 232$t$ may transmit a set of downlink signals (e.g., T downlink signals) via a corresponding set of antennas 234 (e.g., T antennas), shown as antennas 234$a$ through 234$t$.

At the UE 120, a set of antennas 252 (shown as antennas 252$a$ through 252$r$) may receive the downlink signals from the network node 110 and/or other network nodes 110 and may provide a set of received signals (e.g., R received signals) to a set of modems 254 (e.g., R modems), shown as modems 254$a$ through 254$r$. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234$a$ through 234$t$ and/or antennas 252$a$ through 252$r$) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-11).

The controller/processor 240 of the network node 110, the controller/processor 280 of the UE 120, and/or any other component(s) of FIG. 2 may perform one or more techniques associated with lower layer signaling for secondary cell group selective activation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving configuration information indicating, for each of multiple candidate target PSCells, a lower layer triggered PSCell addition or change configuration (e.g., using antenna 252, modem 254, MIMO detector 256, receive processor 258, controller/processor 280, memory 282, and/or the like); means for transmitting a measurement report indicating beam-level measurements and cell-level measurements associated with the multiple candidate target PSCells (e.g., using controller/processor 280, transmit processor 264, TX MIMO processor 266, modem 254, antenna 252, memory 282, and/or the like); means for receiving, via lower layer signaling and based at least in part on a combination of the beam-level measurements and the cell-level measurements, a PSCell addition or change command indicating a candidate target PSCell, of the multiple candidate target PSCells, that is to be accessed (e.g., using antenna 252, modem 254, MIMO detector 256, receive processor 258, controller/processor 280, memory 282, and/or the like); and/or means for performing, based at least in part on receiving the PSCell addition or change command, a PSCell addition or change procedure associated with the candidate target PSCell based at least in part on a corresponding lower layer triggered PSCell addition or change configuration for the candidate target PSCell (e.g., using controller/processor 280, memory 282, and/or the like). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting configuration information indicating, for each of multiple candidate target PSCells, a lower layer triggered PSCell addition or change configuration (e.g., using controller/processor 240, transmit processor 220, TX MIMO processor 230, modem 232, antenna 234, memory 242, and/or the like); means for receiving a measurement report indicating beam-level measurements and cell-level measurements associated with the multiple candidate target PSCells (e.g., using antenna 234, modem 232, MIMO detector 236, receive processor 238, controller/processor 240, memory 242, and/or the like); means for identifying, based at least in part on a combination of the beam-level measurements and the cell-level measurements, that a UE is to perform a PSCell addition or change procedure (e.g., using controller/processor 240, memory 242, and/or the like); and/or means for transmitting, via lower layer signaling, a PSCell addition or change command indicating a candidate target PSCell, of the multiple candidate target PSCells, that is to be accessed by the UE (e.g., using controller/processor 240, transmit processor 220, TX MIMO processor 230, modem 232, antenna 234, memory 242, and/or the like). The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
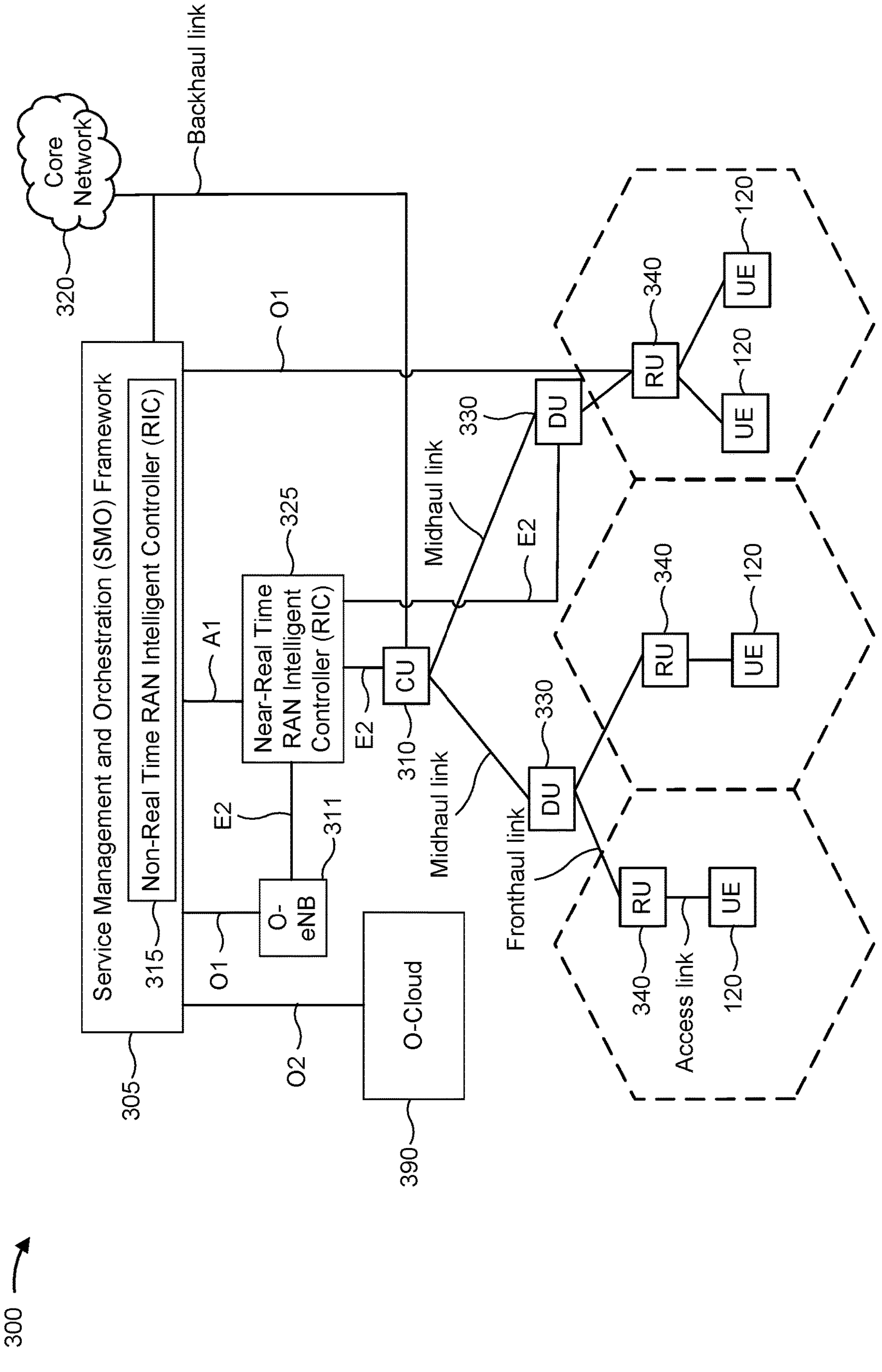
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
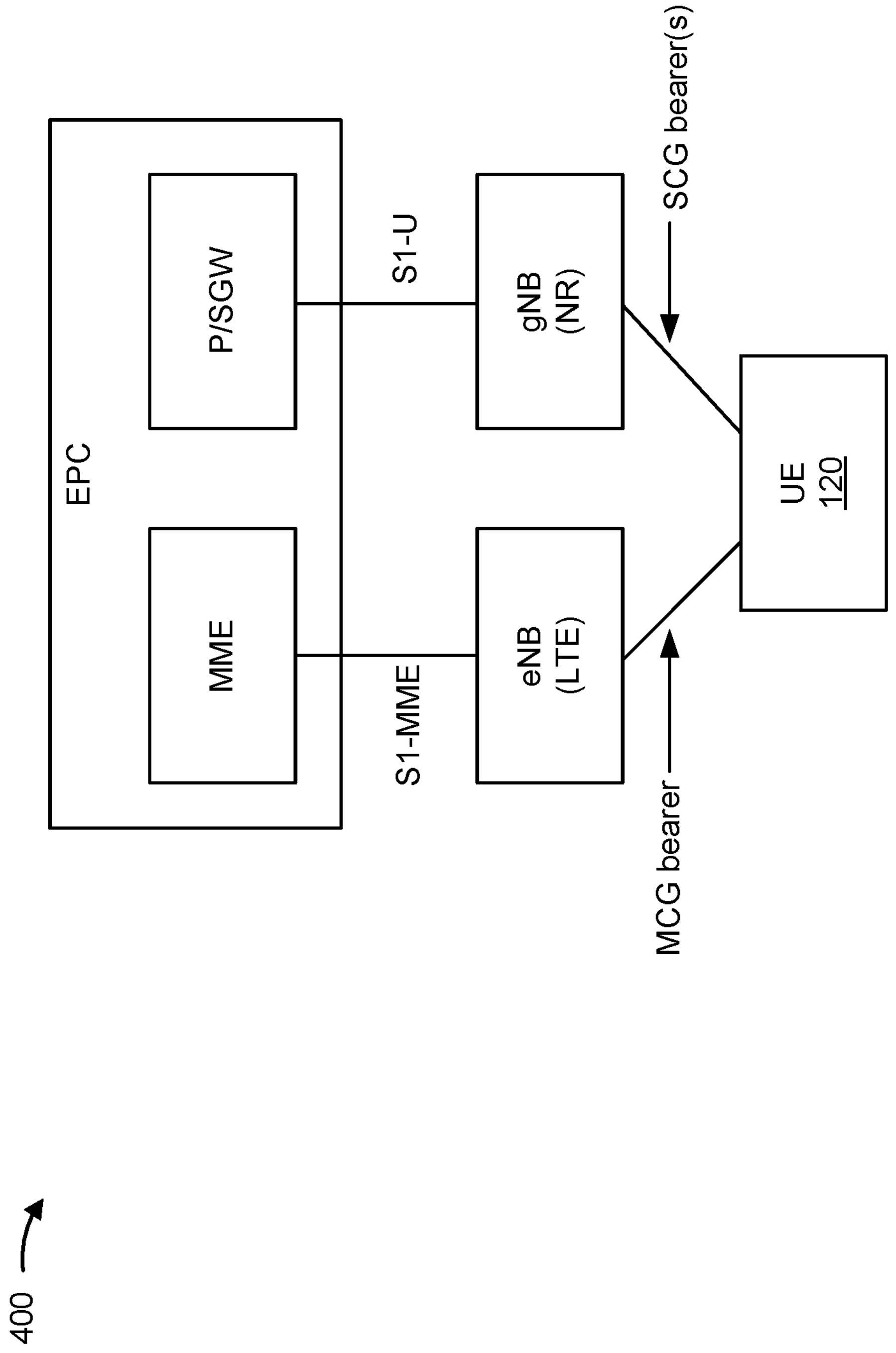
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NR-DC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NR-DC mode, and/or another type of dual connectivity mode.

As shown in FIG. 4, a UE 120 may communicate with both an eNB (e.g., a 4G network node 110) and a gNB (e.g., a 5G network node 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same network node 110. In some aspects, the eNB and the gNB may be included in different network nodes 110 (e.g., may not be co-located).

As further shown in FIG. 4, in some aspects, a wireless network that permits operation in a 5G NSA mode may permit such operations using a master cell group (MCG) for a first RAT (e.g., an LTE RAT or a 4G RAT in the example shown in FIG. 4, but which may include an NR RAT or a 5G RAT in other examples, such as NR-DC examples) and a secondary cell group (SCG) for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE network node 110 (e.g., an eNB) and an NR network node 110 (e.g., a gNB) (e.g., in the case of ENDC or NEDC), or may be concurrently connected with one or more network nodes 110 that use the same RAT (e.g., in the case of NR-DC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

A UE 120 may use dual connectivity to connect to multiple cells at once. For example, the UE 120 may select a set of candidate cells, and may select one or more primary cells (PCells), secondary cells (SCells), primary secondary cells (PSCells), and/or special cells (SpCells). PCells and SCells may be referred to as serving cells. A serving cell is a cell on which a UE 120 may transmit or receive data communications. In some examples, “SpCell” may refer to a PCell of an MCG or a PSCell of an SCG. An SpCell may be a cell on which a UE 120 may transmit or receive control signaling, random access channel (RACH) messages, or similar communications, in addition to data communications. In some dual connectivity modes, a network node 110 associated with an MCG and/or a PCell may be referred to as a master node (MN), and/or a network node 110 associated with an SCG and/or a PSCell may be referred to as a secondary node (SN). Accordingly, in some examples, “MN” may refer to a network node 110 from which the UE 120 may receive data and control communications, and “SN” may refer to a network node 110 from which the UE 120 may receive data communications.

In some aspects, a UE 120 may be provided with conditional configurations for performing a PSCell cell change or addition if one more execution conditions are met. For example, a UE 120 may be provided with a conditional PSCell change (CPC) configuration associated with a CPC procedure and/or a conditional PSCell addition (CPA) configuration associated with a CPA procedure. In examples in which the UE 120 is provided with a CPC configuration, the UE 120 may change a PSCell (e.g., perform a CPC procedure) if one or more execution conditions are met, such as if a measurement (e.g., an RSRP measurement, an RSSI measurement, an RSRQ measurement, a signal-to-interference-plus-noise ratio (SINR) measurement, or similar measurement) associated with a current PSCell falls below a certain threshold, if a measurement associated with a candidate cell (sometimes referred to as a target cell) exceeds a certain threshold, if a measurement associated with a candidate cell becomes better (e.g., offset) from a corresponding measurement associated with the current PSCell by a certain threshold amount, or a similar execution condition. Similarly, in examples in which the UE 120 is provided with a CPA configuration, the UE 120 may add a PSCell (e.g., may perform a CPA procedure and/or enter a dual connectivity mode) if one or more execution conditions are met, such as if a measurement (e.g., an RSRP measurement, an RSSI measurement, an RSRQ measurement, an SINR measurement, or similar measurement) associated with a candidate cell exceeds a certain threshold, or a similar execution condition.

In such examples, after performing the CPC procedure or the CPA procedure, the UE 120 may discard the corresponding CPC configuration or CPA configuration. In some examples, the UE 120 may be then provided with another CPC configuration (sometimes referred to a subsequent CPC configuration) for performing a subsequent CPC procedure (sometimes referred to as another CPC procedure or a second CPC procedure). The UE 120 may use the subsequent CPC configuration when performing a subsequent CPC procedure, such as when one or more execution conditions associated with another target cell are satisfied. In this regard, the subsequent CPC procedure may be associated with high latency and/or high overhead, because the UE 120 may need to be reconfigured between an initial CPC or CPA procedure and the subsequent CPC procedure.

Some techniques and apparatuses described herein enable PSCell changes and/or successive PSCell changes using lower layer (e.g., layer 1 (L1) and/or layer 2 (L2)) signaling. In some aspects, a UE 120 may be configured with a lower layer triggered PSCell addition or change configuration for each of multiple candidate target PSCells. The UE 120 may perform period beam-level measurements and cell-level measurements and transmit, to a network node 110 (e.g., a source MN or a source SN) a measurement report including the beam-level measurements and the cell-level measurements. Based at least in part on a combination of the beam-level measurements and the cell-level measurements, the network node 110 may identify that the UE 120 is to perform a PSCell cell addition or change procedure, and thus signal the PSCell addition or change to the UE 120 using lower layer signaling (e.g., L1 or L2 signaling). The UE 120 may thus perform the PSCell cell addition or change procedure to a candidate target PSCell based at least in part on a corresponding lower layer triggered PSCell addition or change configuration. In some aspects, the UE 120 may perform successive PSCell changes without being reconfigured by the network, such as by receiving one or more additional PSCell change commands and performing the PSCell change to other candidate target PSCells based at least in part on a corresponding lower layer triggered PSCell addition or change configuration stored at the UE 120. As a result, the PSCell addition or change procedures may be associated with reduced latency and/or reduced overhead as compared to traditional PSCell addition or change procedures, because the PSCell addition or change commands may be signaled using L1/L2 signaling, and/or because the UE 120 does not need to be reconfigured between an initial PSCell addition or change procedure and a subsequent PSCell change procedure.

As indicated above, FIG. 4 is provided as an example. Other examples may differ from what is described with respect to FIG. 4.

Figure 5A:
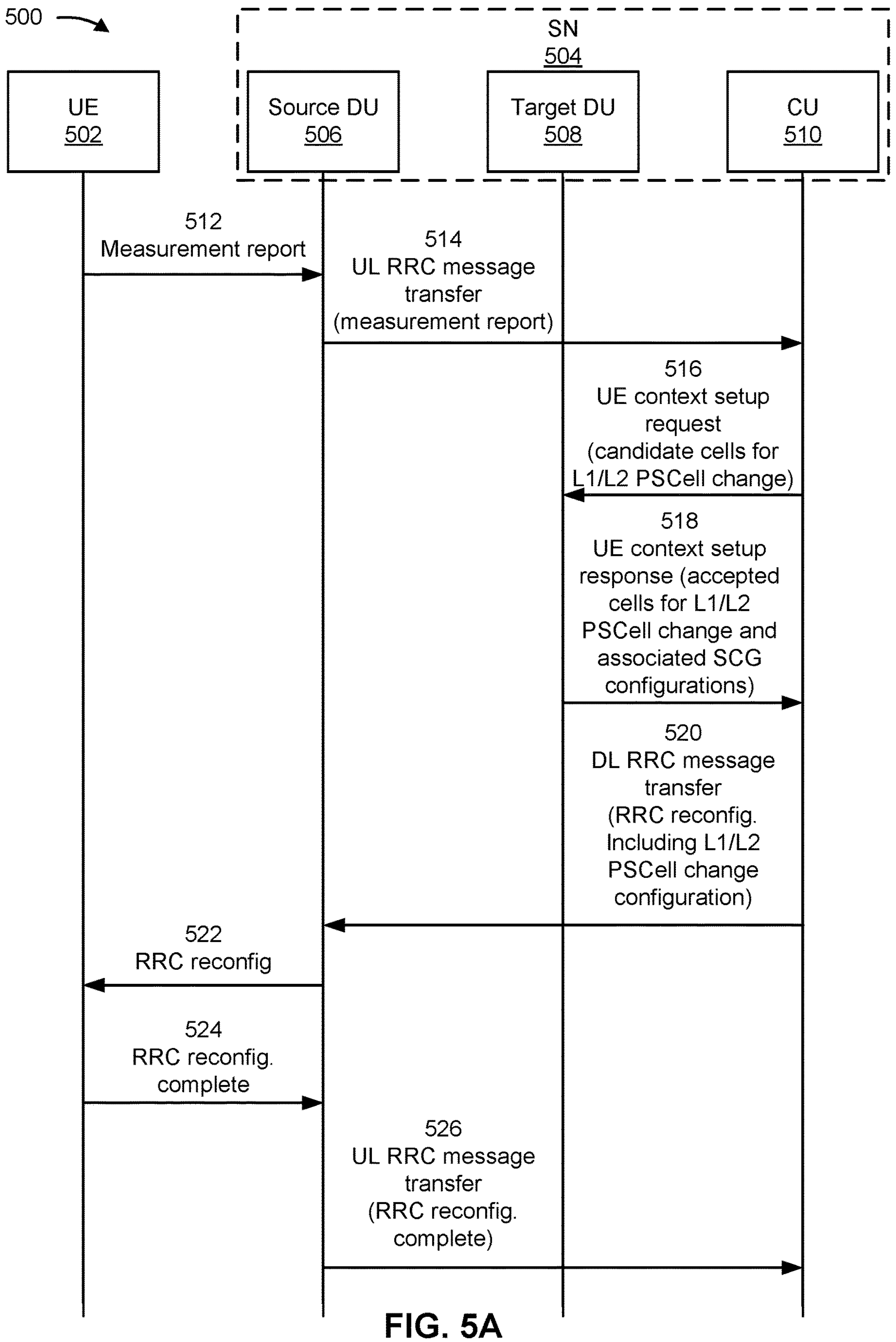
FIGS. 5A-5B are diagrams of an example associated with lower layer signaling for secondary cell group selective activation, in accordance with the present disclosure.
Figure 5B:
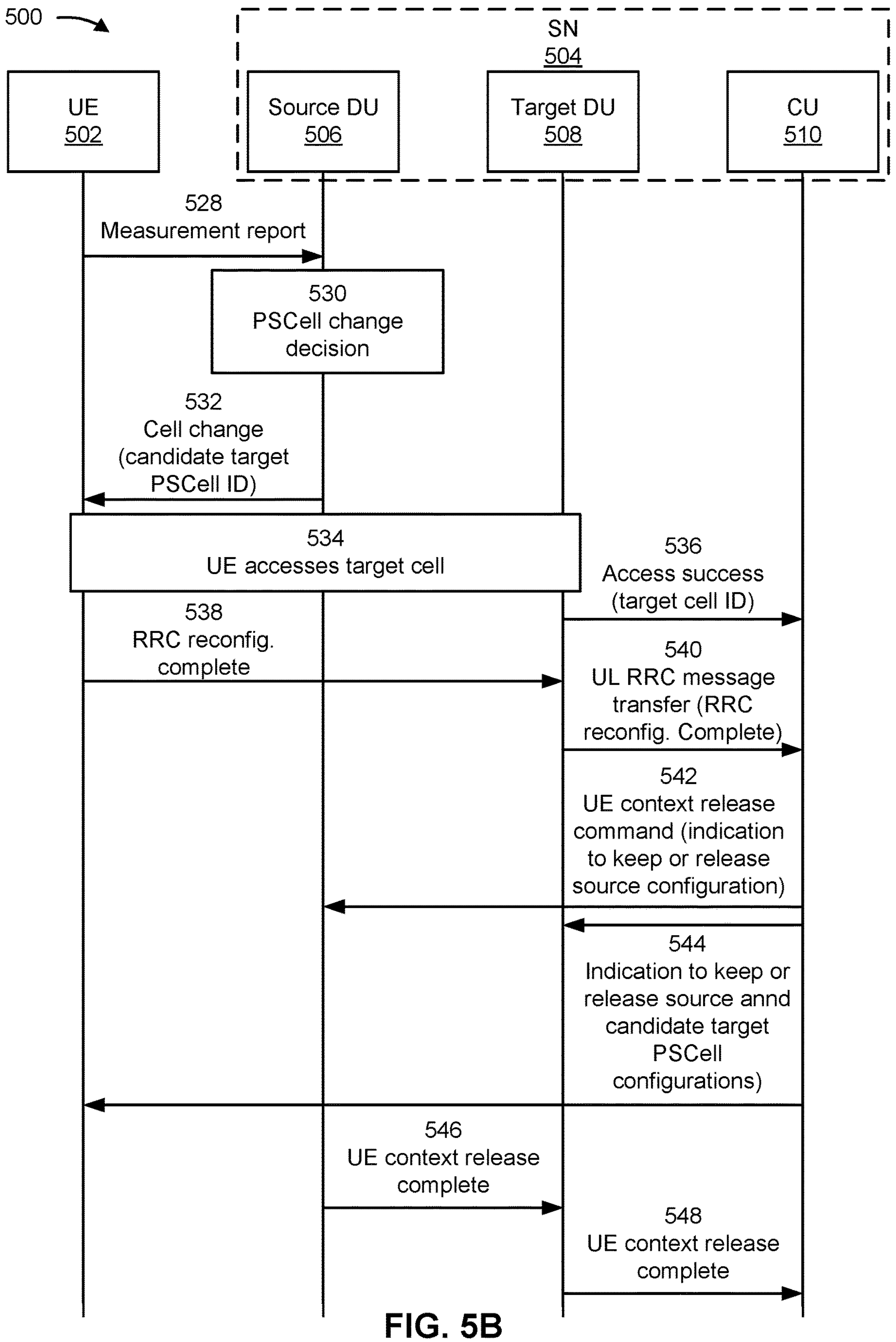

FIGS. 5A-5B are diagrams of an example 500 associated with lower layer signaling for secondary cell group selective activation, in accordance with the present disclosure. In some aspects, operations described below in connection with FIGS. 5A-11 may be associated with, and/or referred to, as lower-layer triggered mobility (LTM) and/or L1/L2 triggered mobility. Additionally, or alternatively, lower-layer signaling and/or L1/L2 signaling described herein may sometimes be referred to as LTM signaling.

FIGS. 5A-5B are diagrams of an L1/L2 intra-SN PSCell change procedure for a UE operating in a dual connectivity mode, such as an NR-DC mode or similar dual connectivity mode. In some aspects, the L1/L2 intra-SN PSCell change procedure (sometimes referred to as an intra-CU procedure) may be utilized when a signaling radio bearer 3 (SRB3) (e.g., an SRB used to transmit RRC messages or similar messages between a UE and an SN) has been configured by the network. In such aspects, RRC signaling between the UE and the SN may take place over SRB3, and thus an MN may not be involved with the procedure.

As shown in FIGS. 5A-5B, a UE 502 (e.g., UE 120) and an SN 504 (e.g., a network node 110) may communicate with one another. In some aspects, the SN 504 may be associated with one or more CUs, DUs, and/or RUs. For example, in the aspects shown in FIGS. 5A-5B, the SN 504 may be associated with multiple DUs, including a source DU 506 (e.g., a DU associated with a cell to which the UE 502 has established a wireless connection), a target DU 508 (e.g., a DU associated with a candidate cell to which the UE 120 may establish a connection via the operations described herein), and/or a CU 510. In some aspects, the UE 502 and the SN 504 may be part of a wireless network (e.g., wireless network 100). The UE 502 and the SN 504 may have established a wireless connection prior to operations shown in FIGS. 5A-5B, and/or the UE 502 and the SN 504 may be capable of operating in a dual connectivity mode, such as one of the example dual connectivity modes described above in connection with FIG. 4. For example, in the example 500 shown in FIGS. 5A-5B, the UE 502 may have established a dual connection with an MN (sometimes referred to as a source MN) and the SN 504 (and, more particularly, the source DU 506 of the SN 504) prior to operations shown in FIGS. 5A-5B.

At a high level, in the procedures shown in connection with FIGS. 5A-5B, the UE 502 may be configured with multiple candidate target PSCells within the same DU in the SN (e.g., source DU 506 or target DU 508) or multiple candidate target PSCells within different DUs in the SN (e.g., some candidate target PSCells within the source DU 506 and some candidate target PSCells within the target DU 508). Upon receiving a measurement report from the UE 502, the network may decide to initiate a PSCell change, and thus transmit a PSCell change command to the UE 502 via lower layer signaling (e.g., via L1 signaling, such as via a downlink control information (DCI) communication, or L2 signaling, such as via a MAC control element (MAC-CE) communication). In some aspects, the measurement report may include L1 as well as layer 3 (L3) measurements. For example, in some aspects, the measurement report may include beam-level measurements and cell-level measurements.

More particularly, as shown in FIG. 5A, and as indicated by reference number 512, the UE 502 may transmit, and the SN 504 (e.g., the source DU 506 of the SN 504) may receive, a measurement report. The measurement report may indicate measurements associated with one or more cells. For example, the UE 502 may be configured to perform periodic measurements on nearby cells and/or on beams associated with nearby cells, such as RSRP measurements, RSSI measurements, RSRQ measurements, SINR measurements, or similar measurements. In such aspects, the UE 502 may prepare and transmit the measurement report, indicating the various measurements of the nearby cells and/or beams. These measurements may in turn be utilized by the network to determine certain candidate cells for a PSCell addition or change procedure, or a similar procedure. As shown by reference number 514, in some aspects, one entity associated with the SN 504 may transmit the measurement report to another entity associated with the SN 504. More particularly, in the example shown in FIG. 5A, the source DU 506 may transmit, and the CU 510 may receive, an uplink RRC message transfer communication or similar communication, which may provide the measurement report (or information associated therewith) to the CU 510.

As shown by reference number 516, based at least in part on the measurement report (e.g., the beam-level measurements and/or the cell-level measurements), the CU 510 may transmit, and the target DU 508 may receive, a UE context setup request or similar communication that indicates candidate target PSCells for a lower-layer triggered PSCell change procedure (sometimes referred to as an L1/L2 PSCell change procedure and/or an LTM PSCell change procedure). For example, the UE context setup request or similar communication may indicate a list of candidate target PSCells for the L1/L2 PSCell change procedure, and a base SCG configuration. In some aspects, "base SCG configuration" may refer to a set of base configuration parameters that are common to all SCG configurations associated with accessing cells within an SCG. The particular contents of the base SCG configuration may be based at least in part on network implementation. In some aspects, the base SCG configuration may correspond to a source SCG configuration. Accordingly, in some aspects, the UE context setup request or similar communication may include an indication of the source SCG configuration. Moreover, in some aspects, the CU 510 may query the source DU 506 for the source SCG configuration prior to transmitting the UE context setup request or similar communication to the target DU 508.

In response to receiving the UE context setup request or similar communication, the target DU 508 may accept a subset of the candidate target PSCells based at least in part on available resources at the target DU 508, and may indicate the accepted candidate target PSCells to the CU 510. More particularly, as shown by reference number 518, the target DU 508 may transmit, and the CU 510 may receive, a UE context setup response communication or similar communication indicating the accepted candidate target PSCells for the L1/L2 PSCell change procedure, as well as associated SCG configurations for the accepted candidate target PSCells. In some aspects, the UE context setup response communication or similar communication may indicate an accepted list of candidate target PSCells for the L1/L2 PSCell change procedure and corresponding lower layer SCG configurations for each accepted candidate target PSCell. In some aspects, such as in aspects in which the UE context setup request communication or similar communication described above in connection with reference number 516 includes a base SCG configuration, the corresponding lower layer SCG configurations for each accepted candidate target PSCell may be indicated as a delta configuration with respect to the base SCG configuration, which may include indications of a change in configuration parameters from the base SCG configuration for the corresponding candidate target PSCell. In some aspects, the UE context setup response communication or similar communication may include an indication that one or more lower layer SCG configurations for one or more accepted candidate target PSCells are delta configurations. More particularly, in some aspects, the CU 510 may signal the source SCG configuration to the target DU 508 as the base SCG configuration, and the target DU 508 may signal delta configurations with respect to the base SCG configuration (e.g., source SCG configuration) associated with each accepted candidate target PSCell, and an indication for each SCG configuration that the SCG configuration is a delta configuration, when applicable.

In some aspects, the CU 510 may prepare an SCG configuration for each accepted candidate target PSCell (e.g., each candidate target PSCell that was accepted by the target DU 508 as indicated via the UE context setup response communication or similar communication described above in connection with reference number 518) and/or transmit an RRC reconfiguration message to be forwarded to the UE 502. More particularly, as indicated by reference number 520, the CU 510 may transmit, and the source DU 506 may receive, a downlink RRC message transfer communication or similar communication including an RRC reconfiguration message containing the L1/L2 PSCell change configuration to be forwarded to the UE 502. In some aspects, the RRC reconfiguration message containing the L1/L2 PSCell change configuration may include a lower layer triggered PSCell change configuration for each of the accepted candidate target PSCells. More particularly, the RRC reconfiguration message containing the L1/L2 PSCell change configuration may include a list of candidate target PSCells for the L1/L2 PSCell change procedure, the base SCG configuration, and/or a corresponding SCG configuration for each candidate target PSCell. As described above in connection with reference number 518, the corresponding SCG configuration for each candidate target PSCell may be a delta configuration with respect to the base SCG configuration. In some aspects, the RRC reconfiguration message containing the L1/L2 PSCell change configuration may further include, for each candidate target PSCell, an indication of whether the corresponding SCG configuration is a delta configuration with respect to the base SCG configuration. Additionally, in some aspects, the L1/L2 PSCell change configuration may include candidate target PSCells from multiple DUs associated with the SN 504 (e.g., the source DU 506, the target DU 508, and/or other DUs).

As shown by reference numbers 522-526, the SN 504 may configure the UE 502 with the L1/L2 PSCell change configuration (e.g., with the lower layer triggered PSCell change configuration for each of the candidate target PSCells). More particularly, as shown by reference number 522, the SN 504 (e.g., the source DU 506 of the SN 504) may transmit, and the UE 502 may receive, configuration information. In some aspects, the UE 502 may receive the configuration information via one or more of RRC signaling, one or more MAC control elements (MAC-CEs), and/or DCI, among other examples. For example, in some aspects, the SN 504 may transmit, and the UE 502 may receive, the configuration information via an RRC reconfiguration message (shown as "RRC reconfig."). In some aspects, the RRC reconfiguration message or similar message may be transmitted to the UE 502 via SRB3. The configuration information may include an indication of one or more configuration parameters (e.g., already known to the UE 502 and/or previously indicated by the SN 504 or other network device) for selection by the UE 502, and/or explicit configuration information for the UE 502 to use to configure the UE 502, among other examples.

In some aspects, the configuration information may indicate the L1/L2 PSCell change configuration. Put another way, in some aspects, the configuration information may indicate, for each of multiple candidate target PSCells, a lower layer triggered PSCell change configuration. The UE 502 may configure itself based at least in part on the configuration information. In some aspects, the UE 502 may be configured to perform one or more operations described herein based at least in part on the configuration information. Additionally, in some aspects, the UE 502 may transmit, and the SN 504 (e.g., the source DU 506 of the SN 504) may receive, a message indicating that the UE 502 has configured itself based at least in part on the configuration information, such as the RRC reconfiguration complete message shown in connection with reference number 524. Additionally, or alternatively, one entity associated with the SN 504 may communicate to another entity associated with the SN 504 that reconfiguration of the UE 502 is complete. For example, as shown by reference number 526, the source DU 506 may transmit, and the CU 510 may receive, an uplink RRC message transfer communication or similar configuration, which may forward the RRC reconfiguration complete message to the CU 510.

As shown in FIG. 5B, in some aspects, based at least in part on measurement reports from the UE 502, the SN 504 (e.g., the source DU 506 of the SN 504) may initiate a PSCell change and thus transmit a PSCell change command (sometimes referred to as a PSCell change indication message) to the UE 502 that indicates the candidate target PSCell identifier (ID) to be accessed by the UE 502. More particularly, as shown by reference number 528, the UE 502 may transmit, and the SN 504 (e.g., the source DU 506 of the SN 504) may receive, a measurement report. In some aspects, the measurement report may include certain measurements associated with the candidate target PSCells indicated in the configuration information, such as RSRP measurements, RSRQ measurements, RSSI measurement, SINR measurements, or similar measurements. In some aspects, the measurement report may include L1 measurements and/or L3 measurements. For example, the measurement report may indicate beam-level measurements and/or cell-level measurements associated with the multiple candidate target PSCells indicated by the configuration information.

As shown by reference number 530, the SN 504 (e.g., the source DU 506 of the SN 504) may identify, based at least in part on the beam-level measurements included in the measurement report, the cell-level measurements included in the measurement report, or a combination of the beam-level measurements and cell-level measurements included in the measurement report, that the UE 502 is to perform a PSCell change procedure. For example, the SN 504 (e.g., the source DU 506 of the SN 504) may identify that the UE 502 is to perform the PSCell change procedure based at least in part on a candidate target PSCell having more beams that exceed a threshold than a current PSCell. Accordingly, as shown by reference number 532, the SN 504 (e.g., the source DU 506) may transmit, and the UE 502 may receive, a PSCell change command indicating a candidate target PSCell that is to be accessed by the UE 120. In some aspects, the PSCell change command may be transmitted via lower layer signaling (e.g., via L1 and/or L2 signaling). More particularly, in some aspects, the PSCell change command may be transmitted via at least one of a DCI communication or a MAC-CE communication. Additionally, or alternatively, the PSCell change command may include a candidate target PSCell ID corresponding to the candidate target PSCell to be accessed by the UE 502. In some aspects, upon transmitting the PSCell change command or upon receiving an acknowledgement (ACK) to the PSCell change command, the source DU 506 may stop transmitting data and/or control signaling over the source SCG to the UE 502. Additionally, or alternatively, the source DU 506 may transmit an indication to the CU 510 to stop transmitting data and/or control signaling over the source SCG to the UE 502. For example, the source DU 506 may transmit the indication to the CU 510 via an F1 interface.

As shown by reference number 534, based at least in part on receiving the PSCell change command, the UE 502 may access the indicated candidate target PSCell. More particularly, based at least in part on receiving the PSCell change command, the UE 502 may perform s PSCell change procedure based at least in part on a corresponding lower layer triggered PSCell change configuration for the candidate target PSCell. In some aspects, performing the PSCell change procedure may include performing a RACH procedure associated with the candidate target PSCell.

As shown by reference number 536, in some aspects, one entity associated with the SN 504 may signal to another entity associated with the SN 504 that the UE 502 has successfully accessed the candidate target PSCell (e.g., one entity associated with the SN 504 may signal to another entity associated with the SN 504 that the UE 502 has successfully completed the PSCell change procedure). For example, as shown by reference number 536, based at least in part on the UE 502 accessing the target DU 508, which may be associated with the new PSCell, the target DU 508 may transmit, and the CU 510 may receive, an access success communication or similar communication, which may indicate an ID associated with the new PSCell (e.g., the candidate target PSCell indicated in the PSCell change command). Additionally, or alternatively, as shown by reference number 538, the UE 502 may transmit, and the SN 504 (e.g., the target DU 508 of the SN 504) may receive, an RRC reconfiguration complete message or similar message, indicating that the UE 502 has completed the PSCell change procedure. In such aspects, the target DU 508 may forward the RRC reconfiguration complete message or similar message to the CU 510. More particularly, as shown by reference number 540, the target DU 508 may transmit, and the CU 510 may receive, an uplink RRC message transfer communication or similar communication forwarding the RRC reconfiguration message or similar message received from the UE 502, as described above in connection with reference number 538.

In some aspects, following the PSCell change procedure, the CU 510 may indicate to one or more DUs to maintain or release (e.g., discard) the UE source PSCell configuration and/or the source PSCell, and/or the CU 510 may indicate to one or more DUs to maintain (e.g., not discard) or release (e.g., discard) one or more candidate target PSCell configurations and/or one or more candidate target PSCells. More particularly, as shown by reference number 542, the CU 510 may transmit, and the source DU 506 and/or the target DU 508 may receive, a UE context release command communication or similar communication, which may include an indication to maintain or release one or more PSCell configurations and/or or more PSCells. For example, at the operations shown in connection with reference number 542, the CU 510 may transmit an indication to the source DU 506 that indicates whether the source DU 506 should maintain the UE 502 source PSCell configuration and/or the source PSCell. Similarly, at the operations shown in connection with reference number 542, the CU 510 may transmit an indication to the target DU 508 that indicates whether the target DU 508 should maintain the candidate target PSCell configurations and/or the candidate target PSCells. In some aspects, the CU 510 indicates that the source PSCell configuration and/or one or more candidate target PSCell configurations are to be maintained when the source PSCell and/or the one or more candidate target PSCells are candidate target cells for subsequent cell changes.

Additionally, or alternatively, in some aspects, the SN 504 may indicate to the UE whether one or more PSCell configurations are to maintained. More particularly, as shown by reference number 544, the SN 504 (e.g., the CU 510 of the SN 504) may transmit, and the UE 502 may receive, an indication to keep or release the source PSCell configuration and/or one or more candidate target PSCell configurations. For example, the SN 504 may indicate to the UE 502 that the source PSCell configuration and/or one or more candidate target PSCell configurations are to be maintained when the source PSCell and/or the one or more candidate target PSCells are candidate target cells for subsequent lower layer triggered PSCell changes (e.g., subsequent L1/L2 PSCell change procedures). In some aspects, the indication to keep or release the source PSCell configuration and/or one or more candidate target PSCell configurations may be transmitted by the SN 504 to the UE 502 via RRC signaling and/or MAC-CE signaling. Additionally, or alternatively, the network may modify any lower layer triggered PSCell change configurations to be kept by the UE 502. In such aspects, in the communication shown in connection with reference number 544, the SN 504 (e.g., the CU 510 of the SN 504) may transmit, and the UE 502 may receive, one or more modified lower layer triggered PSCell change configurations.

In some aspects, one entity of the SN 504 may transmit a UE context release complete message or similar message to another entity of the SN 504, indicating that the UE 502 has been released by the source DU 506 (e.g., indicating that the source DU 506 is no longer associated with the PSCell of the UE 502). In such aspects, as shown by reference number 546, the source DU 506 may transmit, and the target DU 508 may receive, a UE context release complete message or similar message, and/or, as shown by reference number 548, the target DU 508 may transmit, and the CU 510 may receive, a UE context release complete message or similar message.

In some aspects, the UE 502 may be configured to perform additional (e.g., successive) PSCell change procedures (e.g., subsequent L1/L2 PSCell change procedures) based at least in part on the configuration information maintained by the UE 502. More particularly, in examples in which the UE 502 received the indication to maintain the source and/or candidate target PSCell configurations, as described above in connection with reference number 544, the UE 502 may receive a subsequent PSCell change command from the SN 504 (e.g., the DU of the SN 504 associated with the new PSCell) and thus perform a subsequent PSCell change procedure. In such aspects, the UE 502 may transmit another measurement report indicating other beam-level measurements and/or other cell-level measurements associated with the multiple candidate target PSCells, and, based at least in part on a combination of the other beam-level measurements and the other cell-level measurements, may receive a PSCell change command indicating another candidate target PSCell, of the multiple candidate target PSCells, that is to be accessed (similar to the operations described above in connection with reference numbers 528-532). Accordingly, the UE 502 may perform a subsequent PSCell change procedure based at least in part on a corresponding lower layer triggered PSCell change configuration for the other candidate target PSCell, in a similar manner to the operations described above in connection with reference number 534.

Although the operations described above in connection with FIGS. 5A-5B involve aspects in which SRB3 is configured and/or signaling between the UE 502 and the SN 504 takes place over SRB3 (and thus an MN is not involved), aspects of the disclosure are not so limited. In some aspects, a PSCell change may be triggered using lower layer signaling when SRB3 is not configured and/or when signaling takes place between the UE 502 and an MN (e.g., via SRB1). Aspects of a PSCell change that is triggered using lower layer signaling when SRB3 is not configured and/or when signaling takes place between the UE 502 and an MN are described in more detail below in connection with FIGS. 6A-6C.

As indicated above, FIGS. 5A-5B are provided as an example. Other examples may differ from what is described with respect to FIGS. 5A-5B.

Figure 6A:
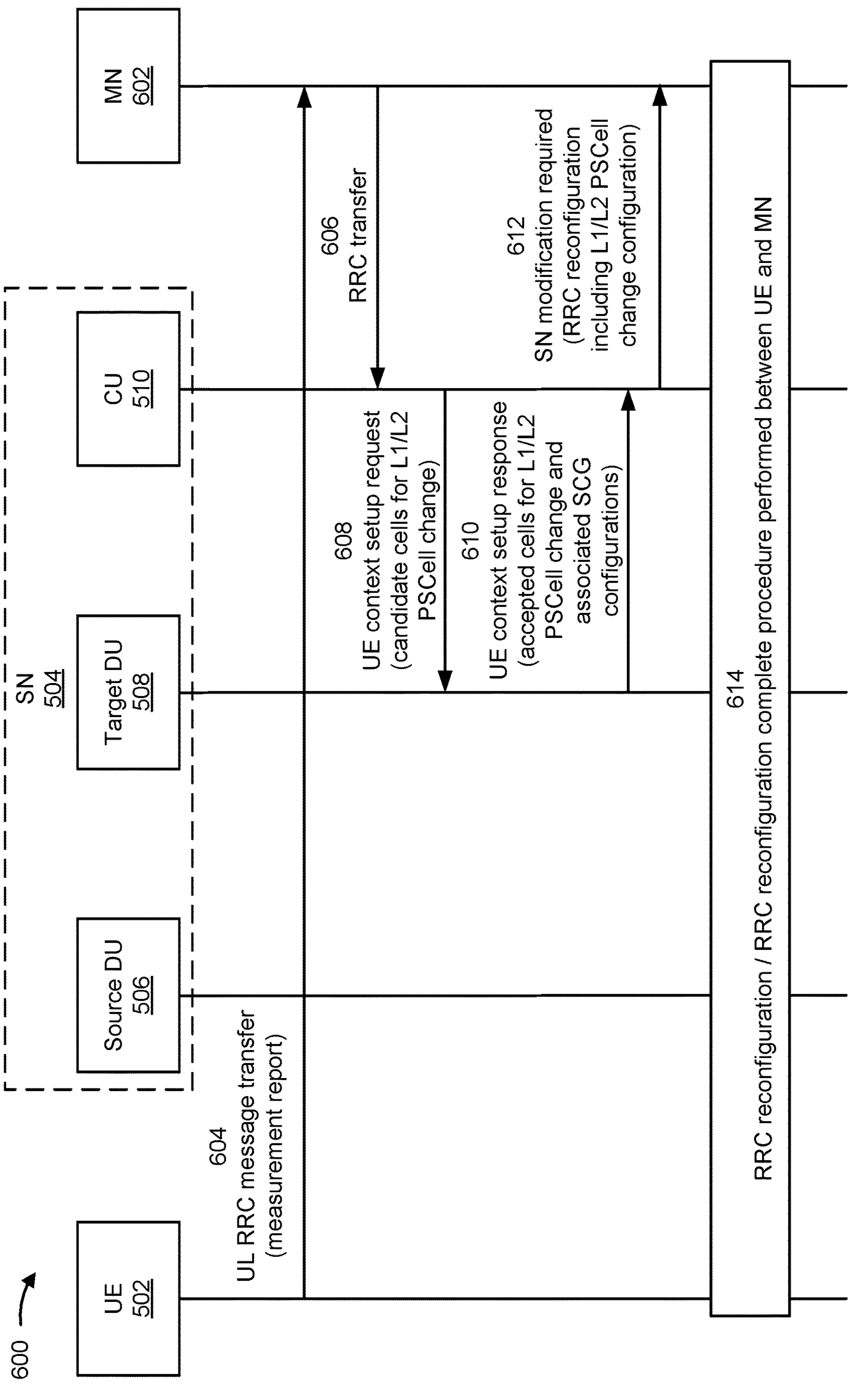
FIGS. 6A-6C are diagrams of another example associated with lower layer signaling for secondary cell group selective activation, in accordance with the present disclosure.
Figure 6B:
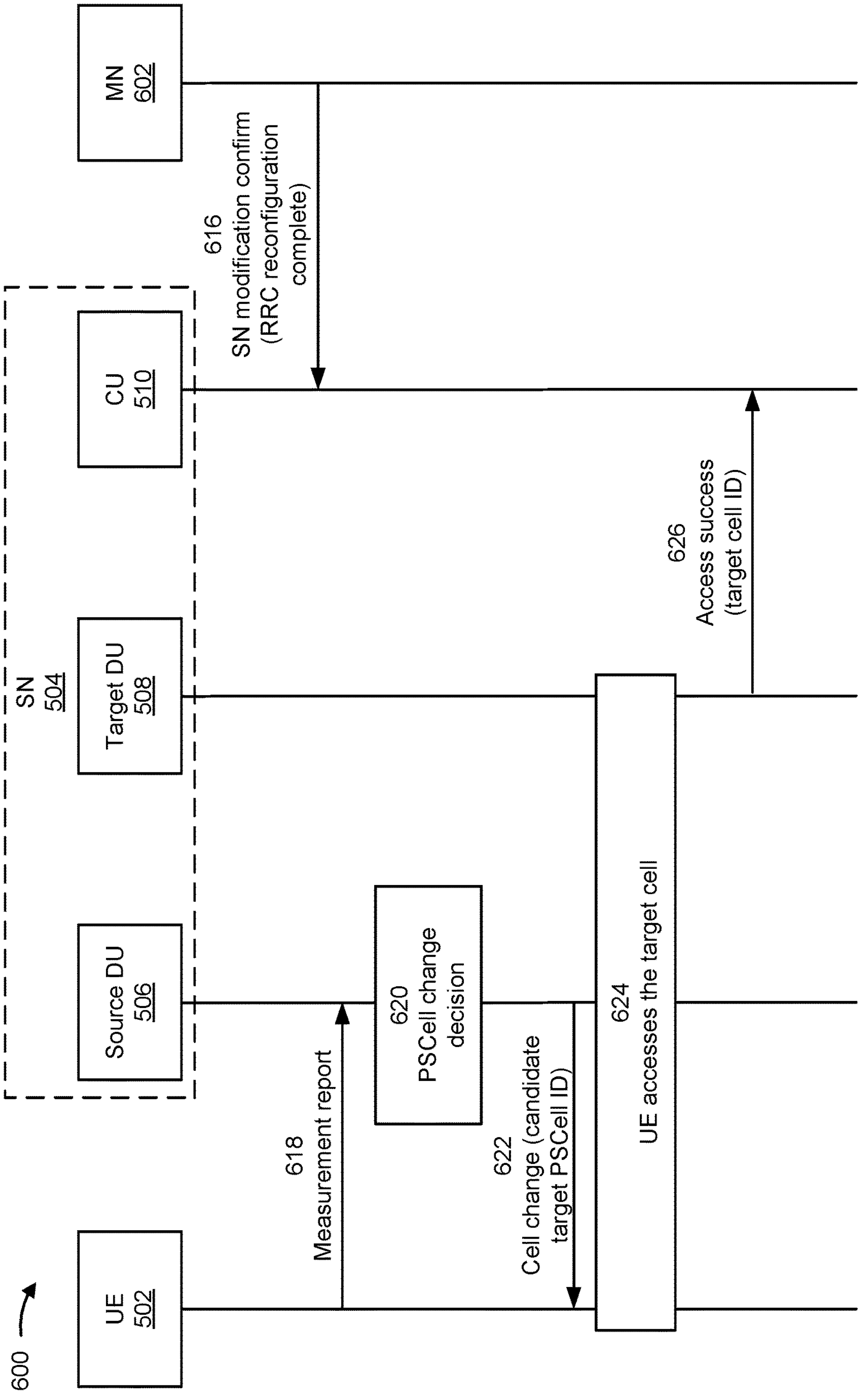
Figure 6C:
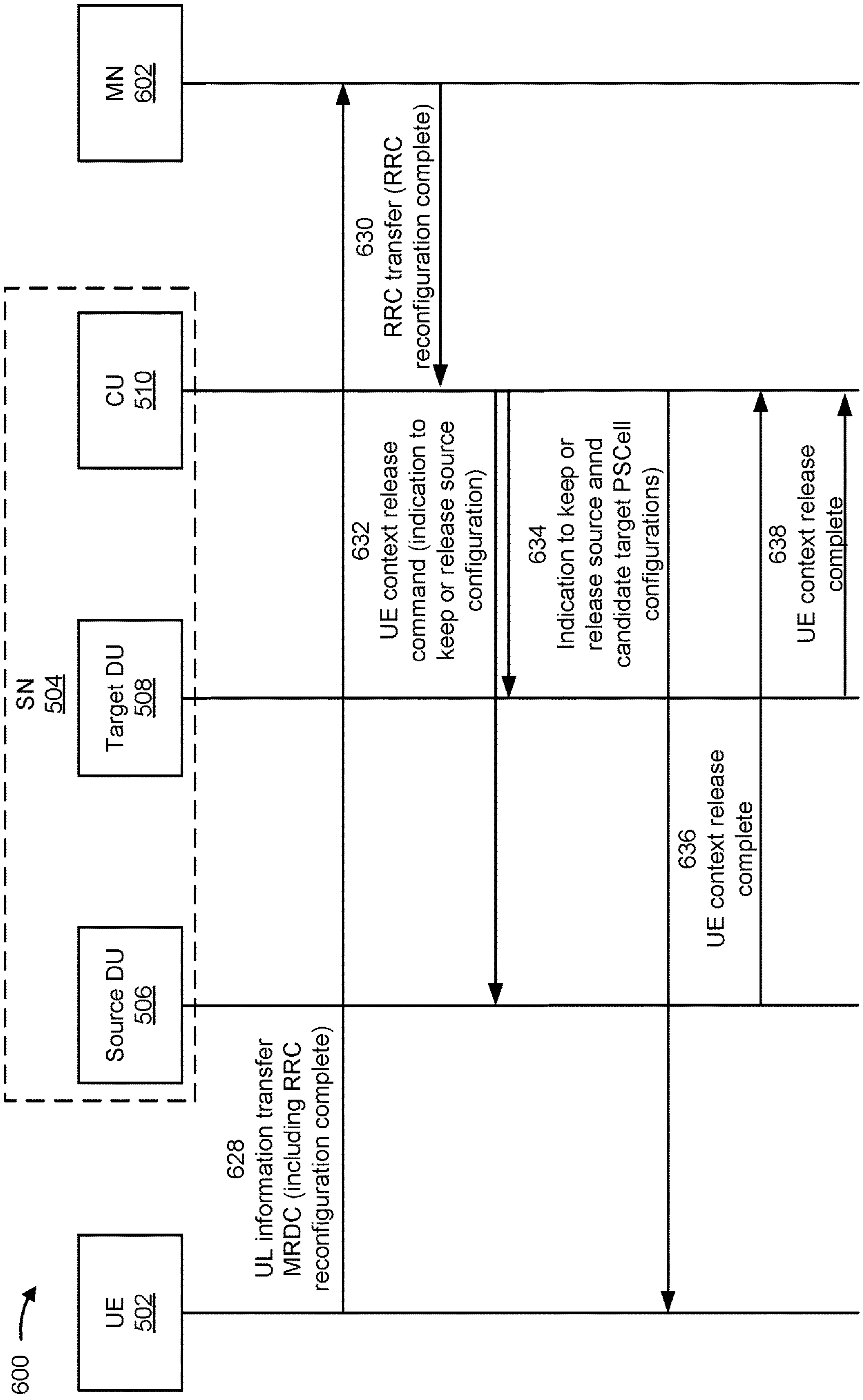

FIGS. 6A-6C are diagrams of an example 600 associated with lower layer signaling for secondary cell group selective activation, in accordance with the present disclosure. More particularly, FIGS. 6A-6C are diagrams of an L1/L2 intra-SN PSCell change procedure for a UE operating in a dual connectivity mode, such as an NR-DC mode or similar dual connectivity mode. In some aspects, the L1/L2 intra-SN PSCell change procedure shown in FIGS. 6A-6C may be utilized when SRB3 is not configured by the network. In such aspects, RRC signaling between the UE and the network may take place over SRB1 (e.g., signaling may be between the UE 502 and an MN).

In that regard, in addition to the UE 502 and the SN 504 described above in connection with FIGS. 5A-5B, the aspects shown in FIGS. 6A-6C may include an MN 602. Moreover, the UE 502, the SN 504, and the MN 602 may be part of a wireless network (e.g., wireless network 100). The UE 502, the SN 504, and the MN 602 may have established a wireless connection prior to operations shown in FIGS. 6A-6C, and/or the UE 502, the SN 504, and the MN 602 may be capable of operating in a dual connectivity mode, such as one of the example dual connectivity modes described above in connection with FIG. 4. For example, in the example 600 shown in FIGS. 6A-6C, the UE 502 may have established a dual connection with the SN 504 (and, more particularly, the source DU 506 of the SN 504) and the MN 602 prior to operations shown in FIGS. 6A-6C.

As shown in FIG. 6A, and as indicated by reference number 604, the UE 502 may transmit, and the MN 602 may receive, a measurement report. Thus, unlike the example described above in connection with FIGS. 5A-5B where the UE 502 transmits the measurement report to the SN 504 (e.g., the source DU 506 of the SN 504), in this aspect the UE 502 may transmit the measurement report to the MN 602. In a similar manner as described above in connection with reference number 512, the measurement report may indicate measurements associated with one or more cells (e.g., beam-level measurements and/or cell-level measurements). For example, the UE 502 may be configured to perform periodic measurements on nearby cells and/or beams associated with nearby cells, such as RSRP measurements, RSSI measurements, RSRQ measurements, SINR measurements, or similar measurements. In such aspects, the UE 502 may prepare and transmit the measurement report, indicating the various measurements of the nearby cells. These measurements may in turn be utilized by the network to determine certain candidate cells for a PSCell change procedure, or a similar procedure. As shown by reference number 606, in some aspects, the MN 602 may transmit the measurement report to the SN 504. More particularly, in the example shown in FIG. 6A, the MN 602 may transmit, and the SN (e.g., the CU 510 of the SN 504) may receive, an RRC transfer communication or similar communication, which may provide the measurement report (or information associated therewith) to the SN 504.

Once the SN 504 (e.g., the CU 510 of the SN 504) receives the measurement report from the MN 602, the L1/L2 intra-SN PSCell change procedure may proceed in a similar manner as described above in connection with FIGS. 6A-6B. For example, as shown by reference number 608, the CU 510 may transmit, and the target DU 508 may receive, a UE context setup request or similar communication, which may be substantially similar to the communication described above in connection with reference number 516. As shown by reference number 610, the target DU 508 may transmit, and the CU 510 may receive, a UE context setup response communication or similar communication, which may be substantially similar to the communication described above in connection with reference number 518.

In some aspects, the CU 510 may prepare an SCG configuration for each accepted candidate target PSCell (e.g., each candidate target PSCell that was accepted by the target DU 508 as indicated via the UE context setup response communication or similar communication described above in connection with reference numbers 518 and 610) and/or transmit an RRC reconfiguration message to be forwarded to the UE 502. More particularly, as shown by reference number 612, the SN 504 (e.g., the CU 510 of the SN 504) may transmit, and the MN 602 may receive, an SN modification required communication or similar communication including an RRC reconfiguration message containing the L1/L2 PSCell change configuration to be forwarded to the UE 502. In a similar manner as described above in connection with reference number 520, the RRC reconfiguration message containing the L1/L2 PSCell change configuration may include a lower layer triggered PSCell change configuration for each of the accepted candidate target PSCells. More particularly, the RRC reconfiguration message containing the L1/L2 PSCell change configuration may include a list of candidate target PSCells for the L1/L2 PSCell change procedure, the base SCG configuration, and/or a corresponding SCG configuration for each candidate target PSCell. As described above in connection with reference number 518, the corresponding SCG configuration for each candidate target PSCell may be a delta configuration with respect to the base SCG configuration. In some aspects, the RRC reconfiguration message containing the L1/L2 PSCell change configuration may further include, for each candidate target PSCell, an indication of whether the corresponding SCG configuration is a delta configuration with respect to the base SCG configuration. Additionally, or alternatively, in some aspects, the L1/L2 PSCell change configuration may include candidate target PSCells from multiple DUs associated with the SN 504 (e.g., the source DU 506, the target DU 508, and/or other DUs).

As shown by reference number 614, the MN 602 may configure the UE 502 with the L1/L2 PSCell change configuration (e.g., with the lower layer triggered PSCell change configuration for each of the candidate target PSCells), which may be substantially similar to the operations described above in connection with reference numbers 522-526. In this aspect, however, the configuration information may be provided to the UE 502 via SRB1 (rather than SRB3, as described above in connection with FIGS. 5A-5B). As shown in FIG. 6B, in some aspects the MN 602 may inform the SN 504 that the reconfiguration of the UE 502 is complete. More particularly, as shown by reference number 616, the MN 602 may transmit, and the SN 504 (e.g., the CU 510 of the SN 504) may receive, an SN modification complete communication or similar communication indicating that the RRC reconfiguration process has been completed.

Following reconfiguration, the UE 502 may be triggered to perform a PSCell change procedure using lower layer signaling, in a substantially similar manner as described above in connection with reference numbers 528-534. More particularly, as shown by reference number 618, the UE 502 may transmit, and the SN 504 (e.g., the source DU 506 of the SN 504) may receive, a measurement report, which may be substantially similar to the measurement report described above in connection with reference number 528. Moreover, as shown by reference number 620, the SN 504 (e.g., the source DU 506 of the SN 504) may identify, based at least in part on the beam-level measurements and/or cell-level measurements included in the measurement report, that the UE 502 is to perform a PSCell change procedure, which may be substantially similar to the operations described above in connection with reference number 530. As shown by reference number 622, the SN 504 (e.g., the source DU 506) may transmit, and the UE 502 may receive, a PSCell change command indicating a candidate target PSCell that is to be accessed by the UE 120, which may be substantially similar to the communication described above in connection with reference number 532. As shown by reference number 624, based at least in part on receiving the PSCell change command, the UE 502 may access the indicated candidate target PSCell, which may be substantially similar to the operations described above in connection with reference number 624. And as shown by reference number 626, based at least in part on the UE 502 accessing the target DU 508, which may be associated with the new PSCell, the target DU 508 may transmit, and the CU 510 may receive, an access success communication or similar communication, which may indicate an ID associated with the new PSCell (e.g., the candidate target PSCell indicated in the PSCell change command), which may be substantially similar to the communication described above in connection with reference number 536.

As shown in FIG. 6C, and as indicated by reference number 628, the UE 502 may transmit, and the MN 602 may receive, an RRC reconfiguration complete message or similar message, indicating that the UE 502 has completed the PSCell change procedure. This may be substantially similar to the message described above in connection with reference number 538; however, in this aspect, the message may be transmitted to the MN 602 rather than the SN 504 because SRB3 may not be configured. In some aspects, the RRC reconfiguration complete message or similar message may be transmitted to the MN 602 via an uplink information transfer multi-RAT dual connectivity (MR-DC) communication or similar communication. In such aspects, the MN 602 may forward the RRC reconfiguration complete message or similar message to the SN 504 (more particularly, to the CU 510 of the SN 504). For example, as shown by reference number 630, the MN 602 may transmit, and the SN 504 (e.g., the CU 510 of the SN 504) may receive, an RRC transfer communication or similar communication forwarding the RRC reconfiguration message or similar message received from the UE 502.

In some aspects, following the PSCell change procedure, the CU 510 may indicate to one or more DUs whether to maintain the UE source PSCell configuration and/or the source PSCell, and/or the CU 510 may indicate to one or more DUs whether to maintain one or more candidate target PSCell configurations and/or one or more candidate target PSCells, in a similar manner as described above in connection with reference numbers 542-548. More particularly, as shown by reference number 632, the CU 510 may transmit, and the source DU 506 and/or the target DU 508 may receive, a UE context release command communication or similar communication, which may be substantially similar to the communication described above in connection with reference number 542. As shown by reference number 544, the SN 504 (e.g., the CU 510 of the SN 504) may transmit, and the UE 502 may receive, an indication to keep or release the source PSCell configuration and/or one or more candidate target PSCell configurations, which may be substantially similar to the communication described above in connection with reference number 544. As shown by reference number 636, the source DU 506 may transmit, and the target DU 508 may receive, a UE context release complete message or similar message, which may be substantially similar to the communication described above in connection with reference number 546. As shown by reference number 638, the target DU 508 may transmit, and the CU 510 may receive, a UE context release complete message or similar message, which may be substantially similar to the communication described above in connection with reference number 548.

As described above in connection with FIGS. 5A-5B, the UE 502 may be configured to perform additional (e.g., successive) PSCell change procedures (e.g., subsequent L1/L2 PSCell change procedures) based at least in part on the configuration information maintained by the UE 502. More particularly, in examples in which the UE 502 received the indication to maintain the source and/or candidate PSCell configurations, as described above in connection with reference number 634, the UE 502 may receive a subsequent PSCell change command from the SN 504 (e.g., the DU of the SN 504 associated with the new PSCell) and thus perform a subsequent PSCell change procedure. In such aspects, the UE 502 may transmit another measurement report indicating other beam-level measurements and/or other cell-level measurements associated with the multiple candidate target PSCells, and, based at least in part on a combination of the other beam-level measurements and the other cell-level measurements, may receive a PSCell change command indicating another candidate target PSCell, of the multiple candidate target PSCells, that is to be accessed (similar to the operations described above in connection with reference numbers 618-622). Accordingly, the UE 502 may perform a subsequent PSCell change procedure based at least in part on a corresponding lower layer triggered PSCell change configuration for the other candidate target PSCell, in a similar manner to the operations described above in connection with reference number 624.

Although the operations described above in connection with FIGS. 5A-6C involve L1/L2 intra-SN PSCell change procedures for a UE operating in a dual connectivity mode, aspects of the disclosure are not so limited. In some other aspects, a UE may be configured to perform an L1/L2 inter-SN PSCell change procedures, in which the UE changes PSCells between a first cell associated with a first SN and a second cell associated with a second SN. Aspects of an L1/L2 inter-SN PSCell change procedure are described in more detail below in connection with FIGS. 7A-7B.

As indicated above, FIGS. 6A-6C are provided as an example. Other examples may differ from what is described with respect to FIGS. 6A-6C.

Figure 7A:
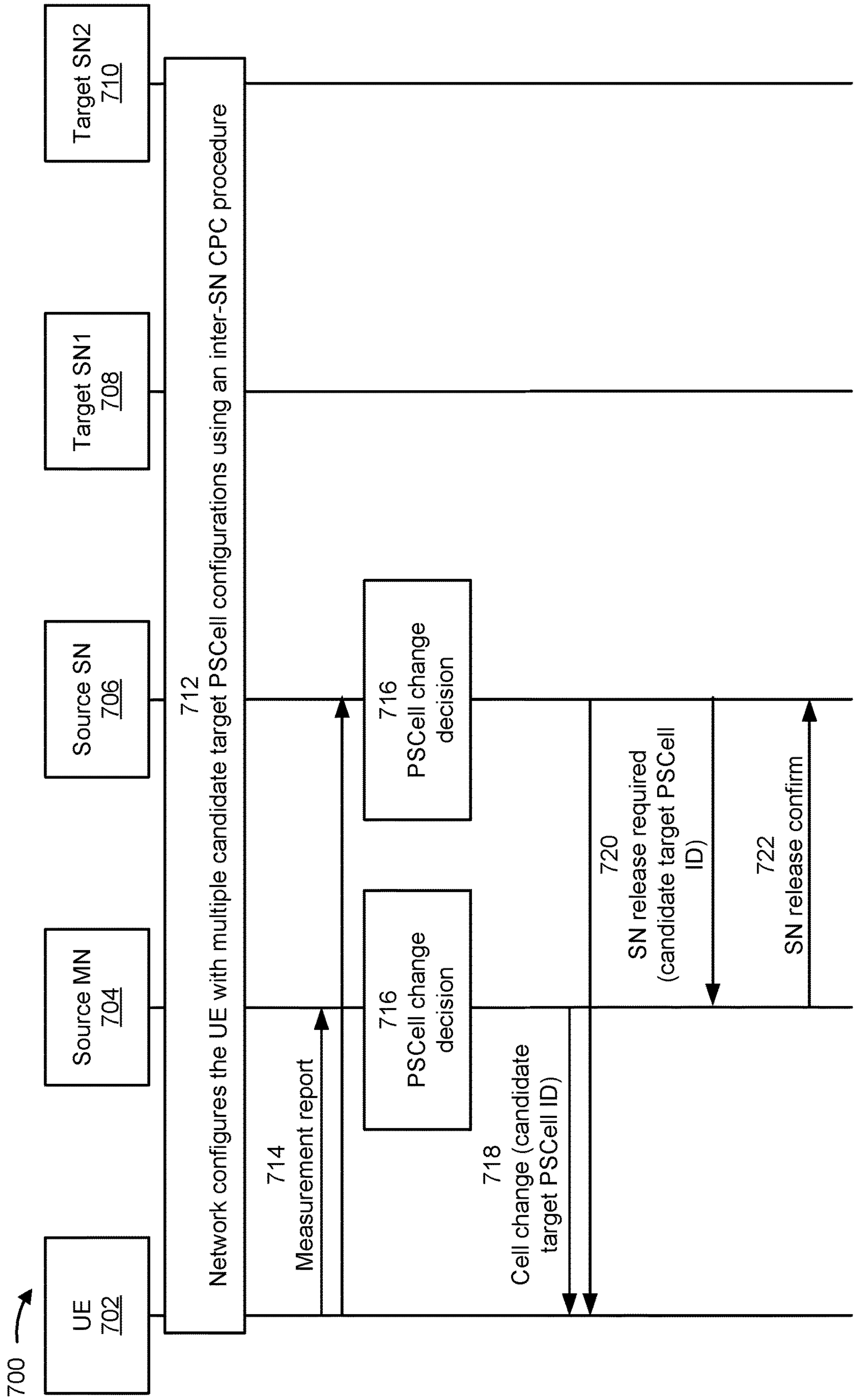
FIGS. 7A-7B are diagrams of another example associated with lower layer signaling for secondary cell group selective activation, in accordance with the present disclosure.
Figure 7B:
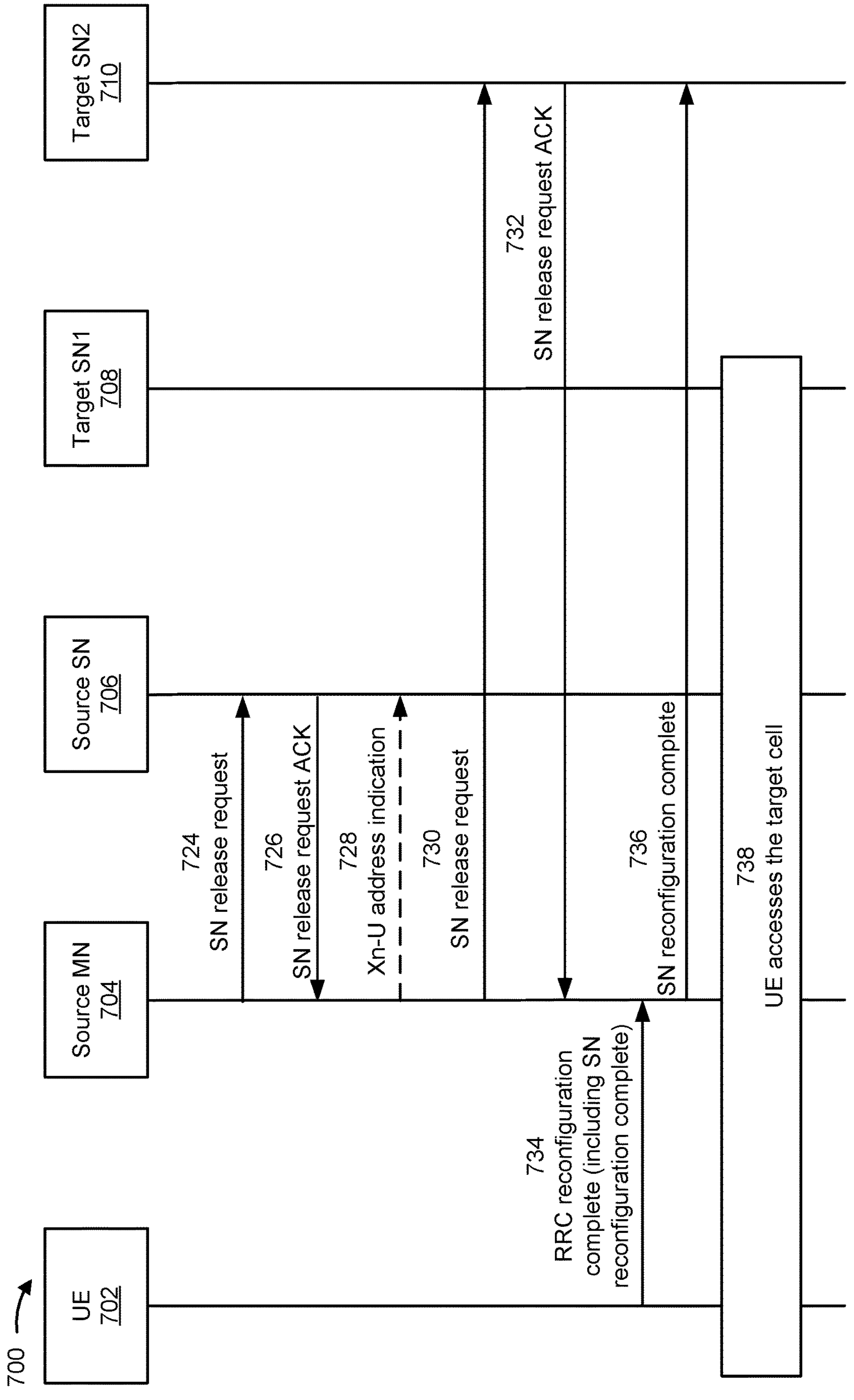

FIGS. 7A-7B are diagrams of an example 700 associated with lower layer signaling for secondary cell group selective activation, in accordance with the present disclosure. More particularly, FIGS. 7A-7B are diagrams of an L1/L2 inter-SN PSCell change procedure for a UE operating in a dual connectivity mode, such as an NR-DC mode or similar dual connectivity mode. In some aspects, the L1/L2 inter-SN PSCell change procedure may be referred to as an inter-CU procedure. In some aspects, the L1/L2 inter-SN PSCell change procedure may be initiated by an SN or an MN, and/or multiple PSCells associated with multiple target SNs may be configured and/or selected for performing a PSCell change procedure.

As shown in FIGS. 7A-7B, a UE 702 (e.g., UE 120, UE 502), a source MN 704 (e.g., network node 110, MN 602), a source SN 706 (e.g., network node 110, SN 504), a first target SN (e.g., network node 110), shown as target SN1 708, and a second target SN (e.g., network node 110), shown as target SN2 710, may communicate with one another. In some aspects, the source MN 704, the source SN 706, the target SN1 708, and/or the target SN2 710 may be associated with one or more CUs, DUs, and/or RUs, as described above in detail in connection with FIG. 3 and FIGS. 5A-6C. In some aspects, the UE 502, the source MN 704, the source SN 706, the target SN1 708, and/or the target SN2 710 may be part of a wireless network (e.g., wireless network 100). The UE 502, the source MN 704, the source SN 706, the target SN1 708, and/or the target SN2 710 may have established a wireless connection prior to operations shown in FIGS. 7A-7B, and/or the UE 502, the source MN 704, the source SN 706, the target SN1 708, and/or the target SN2 710 may be capable of operating in a dual connectivity mode, such as one of the example dual connectivity modes described above in connection with FIG. 4. For example, in the example 700 shown in FIGS. 7A-7B, the UE 502 may have established a dual connection with the source MN 704 and the source SN 706 prior to operations shown in FIGS. 7A-7B.

At a high level, in the procedures shown in connection with FIGS. 7A-7B, the UE 502 may be configured with multiple candidate target PSCells associated with multiple SNs (e.g., some candidate target PSCells associated with the target SN1 708 and some candidate target PSCells associated with the target SN2 710). Upon receiving a measurement report from the UE 502, the network may decide to initiate a PSCell change, and thus transmit a PSCell change command to the UE 502 via lower layer signaling (e.g., via L1 signaling, such as via a DCI communication, or L2 signaling, such as via a MAC-CE communication). In some aspects, the measurement report may include L1 as well as L3 measurements. For example, in some aspects, the measurement report may include beam-level measurements and cell-level measurements.

More particularly, as shown in FIG. 7A, and as indicated by reference number 712, the network (e.g., the source MN 704 and/or the source SN 706) may configure the UE 502 with multiple candidate target PSCell configurations (e.g., lower layer triggered PSCell change configurations). In some aspects, this may be performed in a similar manner as described above in connection with reference numbers 512-526 and/or reference numbers 604-614.

Additionally, or alternatively, in some aspects, the network may configure the UE 502 with multiple candidate target PSCell configurations using an inter-SN CPC procedure defined by a wireless communication standard, such as the inter-SN CPC procedure defined according to Release 17 of the wireless communication standard promulgated by the 3GPP. Additionally, or alternatively, the network may configure the UE 502 with measurement reporting based at least in part on event triggers. In some aspects, the event triggers may be defined based at least in part on L1 measurements, L3 measurements, or a combination of L1 measurements and L3 measurements.

As shown by reference number 714, the UE 702 may transmit, and the source MN 704 and/or the source SN 706 may receive, a measurement report, which may be substantially similar to the measurement reports described above in connection with reference numbers 528 and 618. In some aspects, the measurement report may include certain measurements associated with the candidate target PSCells indicated in the configuration information, such as RSRP measurements, RSRQ measurements, RSSI measurement, SINR measurements, or similar measurements. In some aspects, the measurement report may include L1 measurements and/or L3 measurements. For example, the measurement report may indicate beam-level measurements associated with the multiple candidate target PSCells indicated by the configuration information.

As shown by reference number 716, the source MN 704 and/or the source SN 706 may identify, based at least in part on the beam-level measurements and/or cell-level measurements included in the measurement report, that the UE 702 is to perform a PSCell addition procedure (e.g., when the UE 120 is operating in standalone mode) or a PSCell change procedure, which may be substantially similar to the operations described above in connection with reference numbers 530 and 620. More particularly, in aspects in which the measurement report is transmitted to the source MN 704, the source MN 704 may identify, based at least in part on the beam-level measurements and/or cell-level measurements included in the measurement report, that the UE 702 is to perform a PSCell addition or change procedure, and, in aspects in which the measurement report is transmitted to the source SN 706, the source SN 706 may identify, based at least in part on the beam-level measurements and/or cell-level measurements included in the measurement report, that the UE 702 is to perform a PSCell change procedure.

Accordingly, as shown by reference number 718, the source MN 704 (e.g., a DU of the source MN 704) and/or the source SN 706 (e.g., a DU of the source SN 706) may transmit, and the UE 502 may receive, a PSCell addition or change command indicating a candidate target PSCell that is to be accessed by the UE 120, which may be substantially similar to the PSCell change commands described above in connection with reference numbers 532 and 622. More particularly, in aspects in which the source MN 704 identifies that the UE 702 is to perform the PSCell addition or change procedure, the source MN 704 may transmit the PSCell addition or change command, and, in aspects in which the source SN 706 identifies that the UE 702 is to perform the PSCell change procedure, the source SN 706 may transmit the PSCell change command. In some aspects, the PSCell change command may be transmitted via lower layer signaling (e.g., via L1 and/or L2 signaling, such as via at least one of a DCI communication or a MAC-CE communication.

In aspects in which the source SN 706 transmits the PSCell change command, the source SN 706 (more particularly, a DU associated with the source SN 706) may cease transmitting data and/or control signaling to the UE 702 over the source SCG upon receiving an acknowledgement communication from the UE 702 in response to the PSCell change command or else upon transmitting the PSCell change command. Additionally, or alternatively, one entity associated with the source SN 706 may transmit an indication to another entity associated with the source SN 706 to stop transmitting data and/or control signaling over the source SCG to the UE 702. For example, a DU associated with the source SN 706 may transmit an indication to a CU associated with source SN 706 to stop transmitting data and/or control signaling over the source SCG to the UE 702, such as via the F1 interface.

Additionally, or alternatively, in aspects in which the source SN 706 transmits the PSCell change command, the source SN 706 may indicate to the source MN 704 that the PSCell change command was transmitted to the UE 702 and/or the source SN 706 may indicate to the source MN 704 an ID associated with the PSCell change command. More particularly, as shown by reference number 720, the source SN 706 may transmit, and the source MN 704 may receive, an SN release required communication or similar communication, which may indicate a candidate target PSCell ID that was indicated by the PSCell change command. In such aspects, the indication described in connection with reference number 720 may alert the source MN 704 that a PSCell change was signaled and/or is imminent, such that if the source MN 704 later receives an RRC reconfiguration complete message or similar message from the UE 702 (which is described in more detail below in connection with reference number 734), the source MN 704 does not consider an error case to have occurred. In some aspects, the source MN 704 may acknowledge the SN release required communication or similar communication received from the source SN 706, such as by transmitting an SN release confirmation message or similar message to the source SN 706, as shown by reference number 722.

In aspects in which the source MN 704 transmits the PSCell change command, the source MN 704 may communicate certain information associated with the PSCell change procedure to the source SN 706. More particularly, as shown in FIG. 7B, and as indicated by reference number 724, the source MN 704 may transmit, and the source SN 706 may receive, an SN release request communication or similar communication. In some aspects, the source MN 704 may transmit the SN release request communication or similar communication upon transmitting the PSCell change command or else upon receiving an acknowledgement from the UE 702 in response to transmitting to the PSCell change command. In some aspects, the SN release request communication or similar communication may include an SN release request to the source SN 706. Based at least in part on receiving the SN release request communication or similar communication, the source SN 706 may cease transmitting data and/or signaling to the UE 702. Additionally, or alternatively, the source SN 706 may acknowledge the SN release request communication or similar communication, such as by transmitting, to the source MN 704, an SN release request ACK communication or similar communication, as shown by reference number 726. Moreover, in some aspects, upon transmitting the PSCell change command or else upon receiving an acknowledgement from the UE 702 in response to transmitting to the PSCell change command, a DU associated with the source MN 704 may transmit to a CU associated with the source MN 704 an indication that the PSCell change command was transmitted to the UE 702 and/or associated information (e.g., a candidate target PSCell ID that was indicated in the PSCell change command).

Additionally, or alternatively, as shown by reference number 728, the source MN 704 may transmit, and the source SN 706 may receive, an Xn-U address indication message or similar message, which may indicate an address of a target SN (e.g., one of target SN1 708 or target SN2 710) associated with the candidate target PSCell indicated in the PSCell change command. In some aspects, the network may utilize early data forwarding techniques, in which certain data or other communications are forwarded to target SNs (e.g., target SN1 708 and/or target SN2 710) prior to initiation of a PSCell change to a cell associated with the target SNs. In such aspects, upon receiving the Xn-U address indication message or similar message, the source SN 706 may initiate late data forwarding, thereby forwarding data or other communications to the target SN associated with the candidate target PSCell indicated by the PSCell change command. Put another way, upon receiving the Xn-U address indication message or similar message, the source SN 706 may initiate late data forwarding toward a target SN (e.g., target SN1 708 and/or target SN2 710) associated with the address in the Xn-U address indication message or similar message.

In some aspects, the source MN 704 may transmit an SN release request communication or similar communication to other SNs (e.g., SNs other than the source SN 706), and/or the source MN 704 may receive an SN release request ACK communication or similar communication from other SNs. For example, as shown by reference number 730, the source MN 704 may transmit, and a target SN (e.g., the target SN2 710) may receive, an SN release request communication or similar communication, which may be substantially similar to the SN release request communication or similar communication described above in connection with reference number 724. Similarly, as shown by reference number 732, a target SN (e.g., target SN2) may transmit, and the source MN 704 may receive, an SN release request ACK communication or similar communication, which may be substantially similar to the SN release request ACK communication or similar communication described above in connection with reference number 726.

Based at least in part on the PSCell change command, the UE 702 may reconfigure itself to perform a PSCell change and/or access the indicated candidate target PSCell, in a similar manner as described above in connection with reference numbers 534-540 and/or 624-630. For example, as shown by reference number 734, the UE 702 may transmit, and the source MN 704 may receive, an RRC reconfiguration complete message or similar message, which may include an SN reconfiguration complete message or similar message. In some aspects, the source MN 704 may forward the SN configuration complete message or similar message to a target SN. More particularly, as shown by reference number 736, the source MN 704 may transmit, and the target SN2 710 may receive, the SN reconfiguration complete message or similar message. As shown by reference number 738, the UE 702 may access the candidate target PSCell indicated by the PSCell change command, such as by performing a RACH procedure or similar procedure. In that regard, the operations performed in connection with reference number 738 may be substantially similar to those described above in connection with reference numbers 534 and 624.

In some aspects, one or more of the communications and/or operations described above in connection with FIGS. 5A-7B may be performed in a different order than the order shown. For example, in aspects in which the UE 702 needs to perform a RACH procedure to access the candidate target PSCell, the UE 702 may access the candidate target PSCell after transmitting the RRC reconfiguration complete message or similar message, as shown in FIG. 7B. In some other aspects, however, the UE 702 may transmit the RRC reconfiguration complete message or similar message after accessing the candidate target PSCell, in a similar manner as described above in connection with reference numbers 538 and 628. Additionally, or alternatively, in aspects in which the source MN 704 transmits the PSCell change command, the source MN 704 may initiate the SN release (e.g., transmit the communications described above in connection with reference numbers 724 and 732) and/or transmit the Xn-U address indication message or similar message (e.g., transmit the communication described above in connection with reference number 730) after receiving the RRC reconfiguration complete message or similar message from the UE 702.

Moreover, although the operations described above in connection with FIGS. 7A-7B are described mostly in connection with an L1/L2 PSCell change procedure, aspects of the disclosure are not so limited. In some aspects, similar operations may be utilized in connection with an L1/L2 PSCell addition procedure (e.g., a procedure in which the UE 702 is initially operating in a standalone mode, and receives a PSCell addition command to add a PSCell). In some aspects, because the UE 702 is not initially in wireless communication with an SN (e.g., because the source SN 706 does not exist in such aspects), the source MN 704 may make the PSCell addition decision. That is, in such aspects, the measurement report described in connection with reference number 714 may be transmitted to the source MN 704, the PSCell change decision (which, in this case, would be a PSCell addition decision) described above in connection with reference number 716 would be performed by the source MN 704, and/or the PSCell change command (which, in this case, would be a PSCell addition command) described above in connection with reference number 718 would be transmitted to the UE 702 by the source MN 704. In that regard, in some aspects described herein, the lower layer triggered PSCell change configurations described above may sometimes be referred to as lower layer triggered PSCell addition or change configurations and/or the PSCell change commands described above may sometimes be referred to as PSCell addition or change commands.

Moreover, in a similar manner as described above in connection with FIGS. 5A-6C, the UE 702 may be configured to perform additional (e.g., successive) PSCell change procedures (e.g., subsequent L1/L2 PSCell change procedures) based at least in part on the configuration information maintained by the UE 702. More particularly, in examples in which the UE 702 maintains the source and/or candidate PSCell configurations, the UE 702 may receive a subsequent PSCell change command from the source MN 704 or a SN (e.g., the SN associated with the new PSCell), and thus the UE 702 may perform a subsequent PSCell change procedure. In such aspects, the UE 702 may transmit another measurement report indicating other beam-level measurements and/or other cell-level measurements associated with the multiple candidate target PSCells, and, based at least in part on a combination of the other beam-level measurements and the other cell-level measurements, may receive a PSCell change command indicating another candidate target PSCell, of the multiple candidate target PSCells, that is to be accessed (similar to the operations described above in connection with reference numbers 714-718). Accordingly, the UE 702 may perform a subsequent PSCell change procedure based at least in part on a corresponding lower layer triggered PSCell addition or change configuration for the other candidate target PSCell, in a similar manner to the operations described above in connection with reference number 738.

Based at least in part on UEs, MNs, and/or SNs utilizing lower layer signaling for SCG selective activation in the manner described above, the UE, the MNs, and/or the SNs may conserve computing, power, network, and/or communication resources that may have otherwise been consumed by CPC procedures, CPA procedures, or similar PSCell addition or change procedures. For example, based at least in part on UEs, MNs, and/or SNs utilizing lower layer signaling for SCG selective activation in the manner described above, the UE may perform successive PSCell additions and/or changes triggered by L1 and/or L2 signaling, which may result in reduced latency and reduced overhead as compared to CPC procedures, CPA procedures, or similar PSCell addition or change procedures.

As indicated above, FIGS. 7A-7B are provided as an example. Other examples may differ from what is described with respect to FIGS. 7A-7B.

Figure 8:
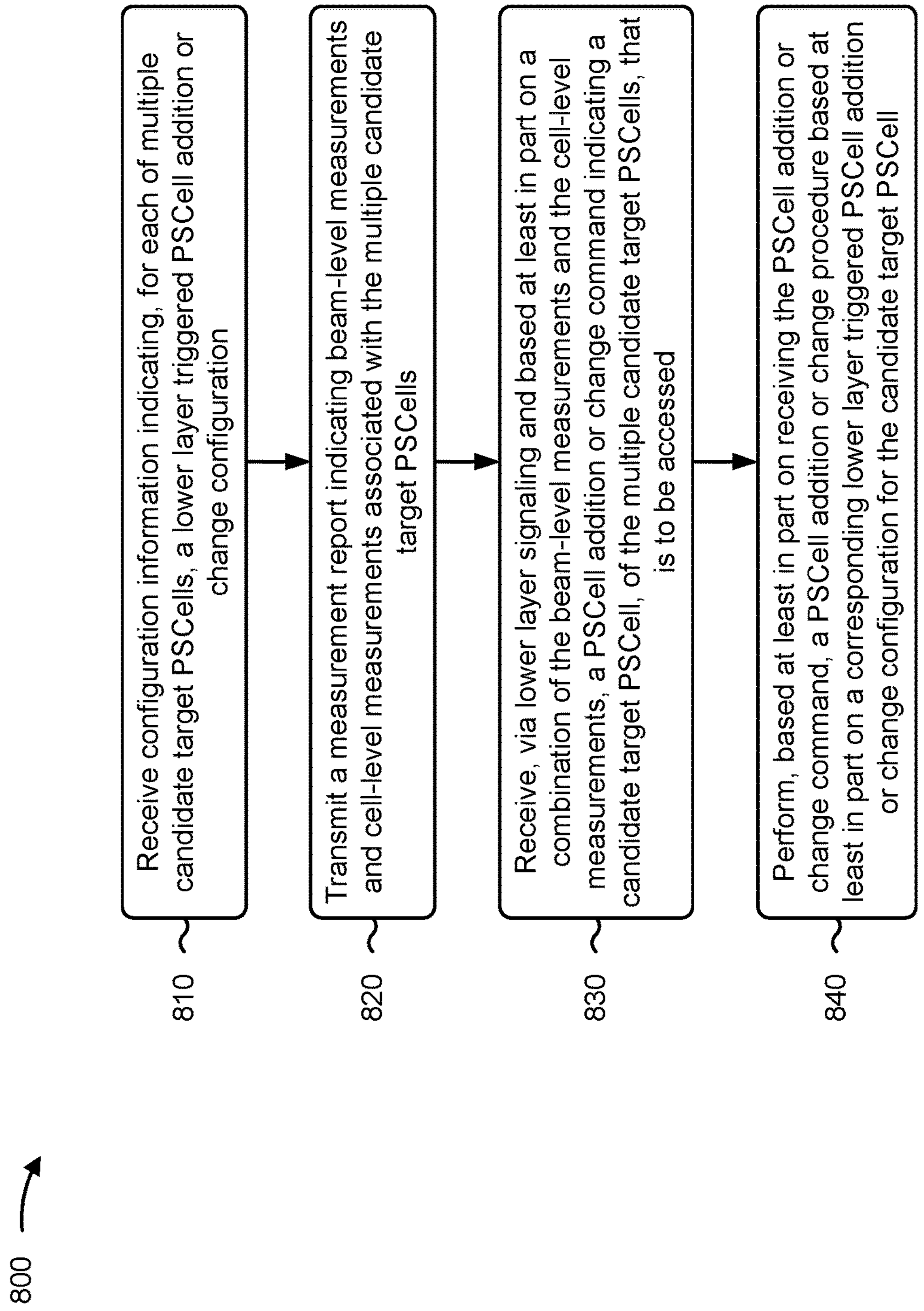
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120, UE 502, UE 702) performs operations associated with lower layer signaling for secondary cell group selective activation.

As shown in FIG. 8, in some aspects, process 800 may include receiving configuration information indicating, for each of multiple candidate target PSCells, a lower layer triggered PSCell addition or change configuration (block 810). For example, the UE (e.g., using communication manager 140 and/or reception component 1002, depicted in FIG. 10) may receive configuration information indicating, for each of multiple candidate target PSCells, a lower layer triggered PSCell addition or change configuration, as described above.

As further shown in FIG. 8, in some aspects, process 800 may include transmitting a measurement report indicating beam-level measurements and cell-level measurements associated with the multiple candidate target PSCells (block 820). For example, the UE (e.g., using communication manager 140 and/or transmission component 1004, depicted in FIG. 10) may transmit a measurement report indicating beam-level measurements and cell-level measurements associated with the multiple candidate target PSCells, as described above.

As further shown in FIG. 8, in some aspects, process 800 may include receiving, via lower layer signaling and based at least in part on a combination of the beam-level measurements and the cell-level measurements, a PSCell addition or change command indicating a candidate target PSCell, of the multiple candidate target PSCells, that is to be accessed (block 830). For example, the UE (e.g., using communication manager 140 and/or reception component 1002, depicted in FIG. 10) may receive, via lower layer signaling and based at least in part on a combination of the beam-level measurements and the cell-level measurements, a PSCell addition or change command indicating a candidate target PSCell, of the multiple candidate target PSCells, that is to be accessed, as described above.

As further shown in FIG. 8, in some aspects, process 800 may include performing, based at least in part on receiving the PSCell addition or change command, a PSCell addition or change procedure associated with the candidate target PSCell based at least in part on a corresponding lower layer triggered PSCell addition or change configuration for the candidate target PSCell (block 840). For example, the UE (e.g., using communication manager 140 and/or performance component 1008, depicted in FIG. 10) may perform, based at least in part on receiving the PSCell addition or change command, a PSCell addition or change procedure associated with the candidate target PSCell based at least in part on a corresponding lower layer triggered PSCell addition or change configuration for the candidate target PSCell, as described above.

Process 800 may include additional aspects, such as any single aspect or any combination of aspects described below and/or in connection with one or more other processes described elsewhere herein.

In a first aspect, the PSCell addition or change procedure includes changing a PSCell from a first cell associated with an SN to a second cell associated with the SN, wherein the second cell is the candidate target PSCell.

In a second aspect, alone or in combination with the first aspect, the PSCell addition or change procedure includes changing a PSCell from a first cell associated with a first SN to a second cell associated with a second SN, wherein the second cell is the candidate target PSCell.

In a third aspect, alone or in combination with one or more of the first through second aspects, the PSCell addition or change procedure includes adding a PSCell from a cell associated with a secondary node (SN), wherein the cell is the candidate target PSCell.

In a fourth aspect, alone or in combination with one or more of the first through third aspects, the multiple candidate target PSCells are associated with a DU associated with an SN.

In a fifth aspect, alone or in combination with one or more of the first through fourth aspects, at least a first candidate target PSCell, of the multiple candidate target PSCells, is associated with a first DU associated with an SN, and at least a second candidate target PSCell, of the multiple candidate target PSCells, is associated with a second DU associated with the SN.

In a sixth aspect, alone or in combination with one or more of the first through fifth aspects, the configuration information indicates at least one of a list of the multiple candidate target PSCells, a base SCG configuration, or, for each candidate target PSCell, of the multiple candidate target PSCells, a corresponding SCG configuration.

In a seventh aspect, alone or in combination with one or more of the first through sixth aspects, the configuration information indicates a base SCG configuration, and, for each candidate target PSCell, of the multiple candidate target PSCells, a delta SCG configuration with respect to the base SCG configuration.

In an eighth aspect, alone or in combination with one or more of the first through seventh aspects, process 800 includes receiving an indication that a corresponding SCG configuration associated with a candidate target PSCell is the delta SCG configuration with respect to the base SCG configuration.

In a ninth aspect, alone or in combination with one or more of the first through eighth aspects, the configuration information is received from a secondary node via an SRB3.

In a tenth aspect, alone or in combination with one or more of the first through ninth aspects, the configuration information is received from a master node via an SRB1.

In an eleventh aspect, alone or in combination with one or more of the first through tenth aspects, process 800 includes receiving an indication whether to maintain one or more lower layer triggered PSCell addition or change configurations and associated radio resources following performance of the PSCell addition or change procedure.

In a twelfth aspect, alone or in combination with one or more of the first through eleventh aspects, the indication whether to maintain the one or more lower layer triggered PSCell addition or change configurations is received via one of a DCI communication, a MAC-CE communication, or an RRC communication.

In a thirteenth aspect, alone or in combination with one or more of the first through twelfth aspects, process 800 includes receiving one or more modified lower layer triggered PSCell addition or change configurations following performance of the PSCell addition or change procedure.

In a fourteenth aspect, alone or in combination with one or more of the first through thirteenth aspects, transmitting the measurement report is based at least in part on one or more event triggers being satisfied.

In a fifteenth aspect, alone or in combination with one or more of the first through fourteenth aspects, the one or more event triggers are based at least in part on at least one of L1 measurements or L3 measurements.

In a sixteenth aspect, alone or in combination with one or more of the first through fifteenth aspects, process 800 includes transmitting another measurement report indicating other beam-level measurements and other cell-level measurements associated with the multiple candidate target PSCells, receiving, via lower layer signaling and based at least in part on a combination of the other beam-level measurements and the other cell-level measurements, a PSCell change command indicating an other candidate target PSCell, of the multiple candidate target PSCells, that is to be accessed, and performing, based at least in part on receiving the PSCell change command, a subsequent PSCell change procedure based at least in part on a corresponding lower layer triggered PSCell addition or change configuration for the other candidate target PSCell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
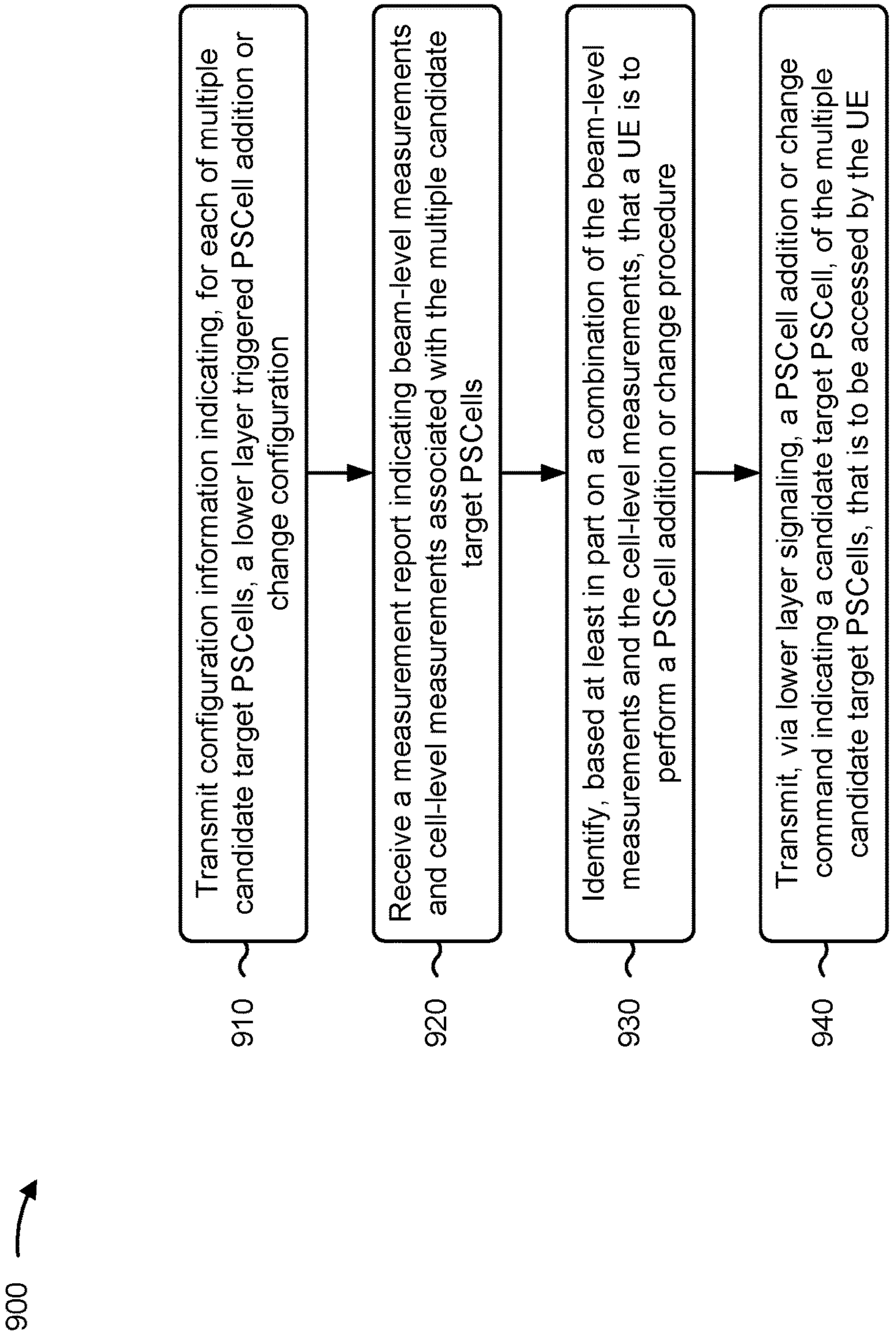
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with lower layer signaling for secondary cell group selective activation.

As shown in FIG. 9, in some aspects, process 900 may include transmitting configuration information indicating, for each of multiple candidate target PSCells, a lower layer triggered PSCell addition or change configuration (block 910). For example, the network node (e.g., using communication manager 150 and/or transmission component 1104, depicted in FIG. 11) may transmit configuration information indicating, for each of multiple candidate target PSCells, a lower layer triggered PSCell addition or change configuration, as described above.

As further shown in FIG. 9, in some aspects, process 900 may include receiving a measurement report indicating beam-level measurements and cell-level measurements associated with the multiple candidate target PSCells (block 920). For example, the network node (e.g., using communication manager 150 and/or reception component 1102, depicted in FIG. 11) may receive a measurement report indicating beam-level measurements and cell-level measurements associated with the multiple candidate target PSCells, as described above.

As further shown in FIG. 9, in some aspects, process 900 may include identifying, based at least in part on a combination of the beam-level measurements and the cell-level measurements, that a UE is to perform a PSCell addition or change procedure (block 930). For example, the network node (e.g., using communication manager 150 and/or identification component 1108, depicted in FIG. 11) may identify, based at least in part on a combination of the beam-level measurements and the cell-level measurements, that a UE is to perform a PSCell addition or change procedure, as described above.

As further shown in FIG. 9, in some aspects, process 900 may include transmitting, via lower layer signaling, a PSCell addition or change command indicating a candidate target PSCell, of the multiple candidate target PSCells, that is to be accessed by the UE (block 940). For example, the network node (e.g., using communication manager 150 and/or transmission component 1104, depicted in FIG. 11) may transmit, via lower layer signaling, a PSCell addition or change command indicating a candidate target PSCell, of the multiple candidate target PSCells, that is to be accessed by the UE, as described above.

Process 900 may include additional aspects, such as any single aspect or any combination of aspects described below and/or in connection with one or more other processes described elsewhere herein.

In a first aspect, the network node is an SN, and the PSCell addition or change procedure includes changing a PSCell from a first cell associated with the SN to a second cell associated with the SN, wherein the second cell is the candidate target PSCell.

In a second aspect, alone or in combination with the first aspect, the network node is a master node or an SN, and the PSCell addition or change procedure includes changing a PSCell from a first cell associated with a first SN to a second cell associated with a second SN, wherein the second cell is the candidate target PSCell.

In a third aspect, alone or in combination with one or more of the first and second aspects, the PSCell addition or change procedure includes adding a PSCell from a cell associated with a secondary node (SN), wherein the cell is the candidate target PSCell.

In a fourth aspect, alone or in combination with one or more of the first through third aspects, the multiple candidate target PSCells are associated with a DU associated with an SN.

In a fifth aspect, alone or in combination with one or more of the first through fourth aspects, at least a first candidate target PSCell, of the multiple candidate target PSCells, is associated with a first DU associated with an SN, and at least a second candidate target PSCell, of the multiple candidate target PSCells, is associated with a second DU associated with the SN.

In a sixth aspect, alone or in combination with one or more of the first through fifth aspects, the configuration information indicates at least one of a list of the multiple candidate target PSCells, a base SCG configuration, or for each candidate target PSCell, of the multiple candidate target PSCells, a corresponding SCG configuration.

In a seventh aspect, alone or in combination with one or more of the first through sixth aspects, the configuration information indicates a base SCG configuration, and, for each candidate target PSCell, of the multiple candidate target PSCells, a delta SCG configuration with respect to the base SCG configuration.

In an eighth aspect, alone or in combination with one or more of the first through seventh aspects, process 900 includes transmitting an indication that a corresponding SCG configuration associated with a candidate target PSCell is the delta SCG configuration with respect to the base SCG configuration.

In a ninth aspect, alone or in combination with one or more of the first through eighth aspects, the network node is a secondary node, and the configuration information is transmitted via an SRB3.

In a tenth aspect, alone or in combination with one or more of the first through ninth aspects, the network node is a secondary node, and the configuration information is transmitted via a master node and via an SRB1.

In an eleventh aspect, alone or in combination with one or more of the first through tenth aspects, process 900 includes transmitting one or more indications indicating whether at least one of the UE, a source DU, or a target DU is to maintain one or more lower layer triggered PSCell addition or change configurations and associated radio resources following performance of the PSCell addition or change procedure.

In a twelfth aspect, alone or in combination with one or more of the first through eleventh aspects, the indication indicating whether the UE is to maintain one or more lower layer triggered PSCell addition or change configurations is transmitted via one of a DCI communication, a MAC-CE communication, or an RRC communication.

In a thirteenth aspect, alone or in combination with one or more of the first through twelfth aspects, process 900 includes transmitting, to at least one of the UE, a source DU, or a target DU, one or more modified lower layer triggered PSCell addition or change configurations and associated radio resources following performance of the PSCell addition or change procedure.

In a fourteenth aspect, alone or in combination with one or more of the first through thirteenth aspects, process 900 includes receiving another measurement report indicating other beam-level measurements and other cell-level measurements associated with the multiple candidate target PSCells, identifying, based at least in part on a combination of the other beam-level measurements and the other cell-level measurements, that the UE is to perform a subsequent PSCell change procedure, and transmitting, via lower layer signaling, a PSCell change command indicating another candidate target PSCell, of the multiple candidate target PSCells, that is to be accessed by the UE.

In a fifteenth aspect, alone or in combination with one or more of the first through fourteenth aspects, process 900 includes transmitting, from a DU associated with the network node to a CU associated with the network node, a message indicating the cell-level measurements associated with the multiple candidate target PSCells.

In a sixteenth aspect, alone or in combination with one or more of the first through fifteenth aspects, process 900 includes transmitting, to another network node, a message indicating the cell-level measurements associated with the multiple candidate target PSCells.

In a seventeenth aspect, alone or in combination with one or more of the first through sixteenth aspects, process 900 includes transmitting, by a CU associated with the network node to a DU associated with the network node, a candidate target PSCell preparation message, wherein the candidate target PSCell preparation message indicates at least one of a list of candidate target PSCells or a base SCG configuration.

In an eighteenth aspect, alone or in combination with one or more of the first through seventeenth aspects, process 900 includes receiving, by the CU associated with the network node from the DU associated with the network node, a candidate target PSCell preparation message response, wherein the candidate target PSCell preparation message response indicates a list of accepted candidate target PSCells and, for each accepted candidate target PSCell, a corresponding lower layer SCG configuration.

In a nineteenth aspect, alone or in combination with one or more of the first through eighteenth aspects, the corresponding lower layer SCG configuration for each accepted candidate target PSCell is associated with a delta configuration with respect to the base SCG configuration, and the candidate target PSCell preparation message response includes, for each accepted candidate target PSCell, an indication that the candidate target PSCell preparation message response includes the delta configuration for the accepted candidate target SCG.

In a twentieth aspect, alone or in combination with one or more of the first through nineteenth aspects, process 900 includes transmitting, by a CU associated with the network node to a DU associated with the network node, a reconfiguration message, wherein the reconfiguration message indicates at least one of a list of the multiple candidate target PSCells, a base SCG configuration, or a corresponding SCG configuration associated with each of the multiple candidate target PSCells.

In a twenty-first aspect, alone or in combination with one or more of the first through twentieth aspects, the corresponding SCG configuration associated with each of the multiple candidate target PSCells is a delta configuration with respect to the base SCG configuration, and the reconfiguration message includes, for each of the multiple candidate target PSCells, an indication that the reconfiguration message includes the delta configuration for the candidate target PSCell.

In a twenty-second aspect, alone or in combination with one or more of the first through twenty-first aspects, process 900 includes ceasing to transmit data to the UE based at least in part on at least one of transmitting the PSCell addition or change command or receiving an acknowledgement message in response to transmitting the PSCell addition or change command.

In a twenty-third aspect, alone or in combination with one or more of the first through twenty-second aspects, process 900 includes transmitting, by a DU associated with the network node to a CU associated with the network node, an indication to stop transmitting data and signaling messages over a source secondary cell group to the UE based at least in part on the at least one of transmitting the PSCell addition or change command or receiving the acknowledgement message in response to transmitting the PSCell addition or change command.

In a twenty-fourth aspect, alone or in combination with one or more of the first through twenty-third aspects, process 900 includes transmitting, from a CU associated with the network node to a DU associated with the network node, an indication of at least one of whether to maintain a source PSCell configuration and associated radio resources, or whether to maintain the lower layer triggered PSCell addition or change configuration and associated radio resources for each of the multiple candidate PSCells.

In a twenty-fifth aspect, alone or in combination with one or more of the first through twenty-fourth aspects, process 900 includes transmitting, to another network node, an indication of the candidate target PSCell that is to be accessed by the UE.

In a twenty-sixth aspect, alone or in combination with one or more of the first through twenty-fifth aspects, process 900 includes transmitting, to another network node, a message indicating at least one of a secondary node release request, or an address of a network node associated with the candidate target PSCell that is to be accessed by the UE.

In a twenty-seventh aspect, alone or in combination with one or more of the first through twenty-sixth aspects, the message indicating the at least one of the secondary node release request, or the address of the network node associated with the candidate target PSCell that is to be accessed by the UE, is transmitted based at least in part on receiving, from the UE, a reconfiguration complete message.

In a twenty-eighth aspect, alone or in combination with one or more of the first through twenty-seventh aspects, process 900 includes transmitting, by a DU associated with the network node to a CU associated with the network node, an indication that the PSCell addition or change command was transmitted.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
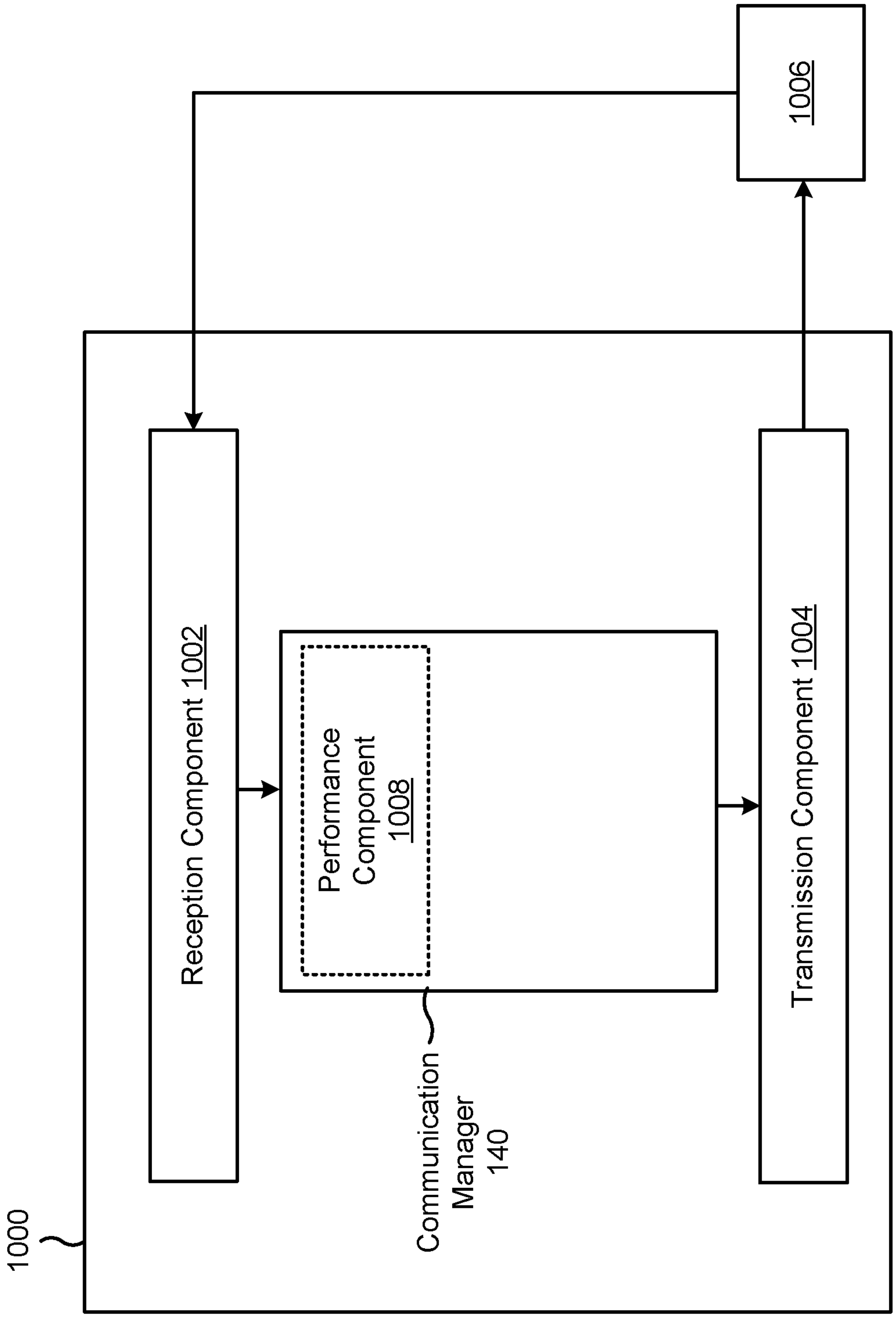
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE (e.g., UE 502, UE 702), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 140. The communication manager 140 may include a performance component 1008, among other examples.

In some aspects, the apparatus 1000 may be configured to perform one or more operations described herein in connection with FIGS. 5A-7B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE 120 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE 120 described in connection with FIG. 2. In some aspects, the transmission component 1004 may be co-located with the reception component 1002 in a transceiver.

The reception component 1002 may receive configuration information indicating, for each of multiple candidate target PSCells, a lower layer triggered PSCell addition or change configuration. The transmission component 1004 may transmit a measurement report indicating beam-level measurements and cell-level measurements associated with the multiple candidate target PSCells. The reception component 1002 may receive, via lower layer signaling and based at least in part on a combination of the beam-level measurements and the cell-level measurements, a PSCell addition or change command indicating a candidate target PSCell, of the multiple candidate target PSCells, that is to be accessed. The performance component 1008 may perform, based at least in part on receiving the PSCell addition or change command, a PSCell addition or change procedure associated with the candidate target PSCell based at least in part on a corresponding lower layer triggered PSCell addition or change configuration for the candidate target PSCell.

The reception component 1002 may receive an indication that a corresponding SCG configuration associated with a candidate target PSCell is the delta SCG configuration with respect to the base SCG configuration.

The reception component 1002 may receive an indication whether to maintain one or more lower layer triggered PSCell addition or change configurations and associated radio resources following performance of the PSCell addition or change procedure.

The reception component 1002 may receive one or more modified lower layer triggered PSCell addition or change configurations following performance of the PSCell addition or change procedure.

The transmission component 1004 may transmit another measurement report indicating other beam-level measurements and other cell-level measurements associated with the multiple candidate target PSCells.

The reception component 1002 may receive, via lower layer signaling and based at least in part on a combination of the other beam-level measurements and the other cell-level measurements, a PSCell change command indicating an other candidate target PSCell, of the multiple candidate target PSCells, that is to be accessed.

The performance component 1008 may perform, based at least in part on receiving the PSCell change command, a subsequent PSCell change procedure based at least in part on a corresponding lower layer triggered PSCell addition or change configuration for the other candidate target PSCell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
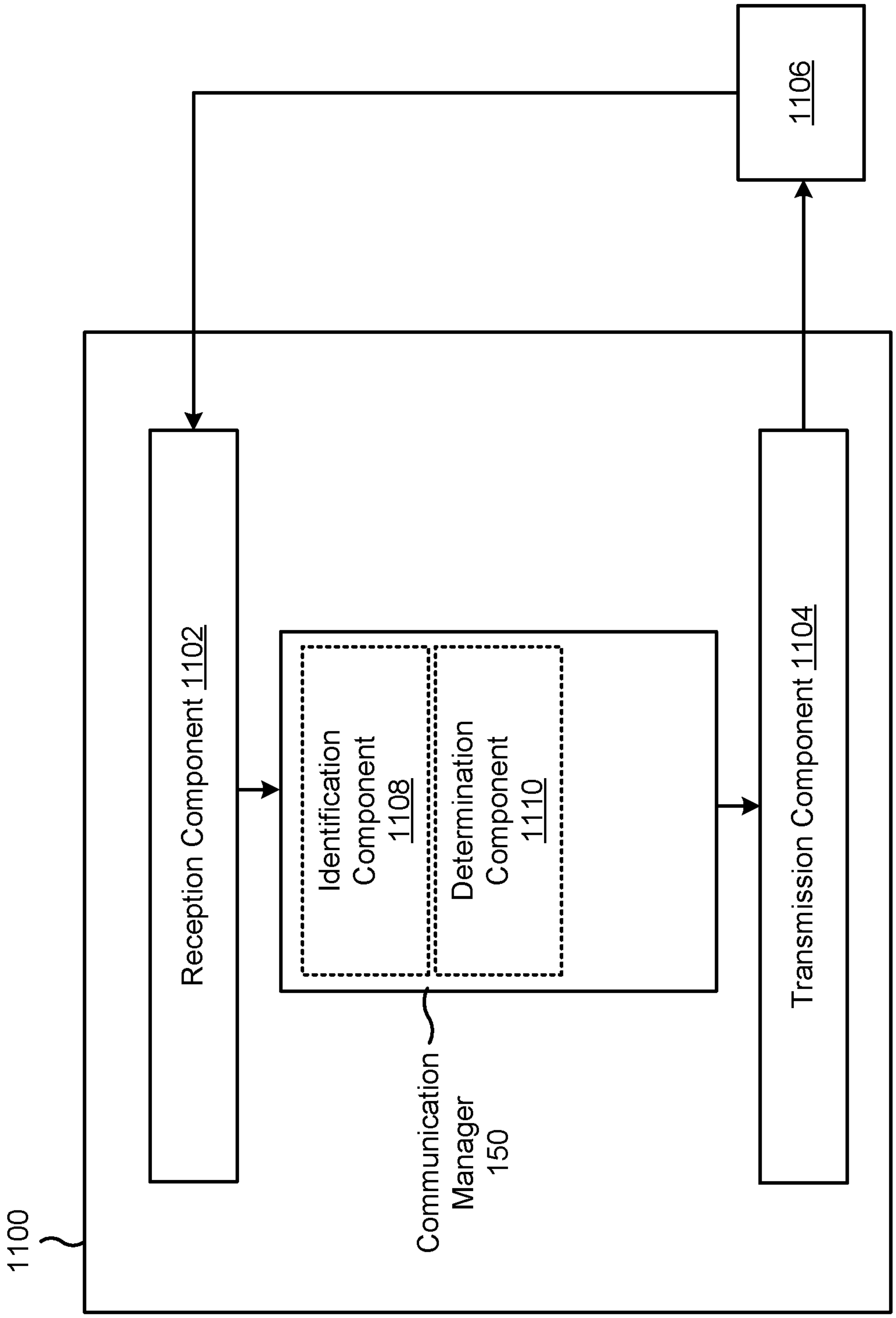
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node (e.g., SN 504, source MN 704, source SN 706), or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network node, or another wireless communication device) using the reception component 1102 and the transmission component 1104. As further shown, the apparatus 1100 may include the communication manager 150. The communication manager 150 may include one or more of an identification component 1108, or a determination component 1110, among other examples.

In some aspects, the apparatus 1100 may be configured to perform one or more operations described herein in connection with FIGS. 5A-7C. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node 110 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node 110 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node 110 described in connection with FIG. 2. In some aspects, the transmission component 1104 may be co-located with the reception component 1102 in a transceiver.

The transmission component 1104 may transmit configuration information indicating, for each of multiple candidate target PSCells, a lower layer triggered PSCell addition or change configuration. The reception component 1102 may receive a measurement report indicating beam-level measurements and cell-level measurements associated with the multiple candidate target PSCells. The identification component 1108 may identify, based at least in part on a combination of the beam-level measurements and the cell-level measurements, that a UE is to perform a PSCell addition or change procedure. The transmission component 1104 may transmit, via lower layer signaling, a PSCell addition or change command indicating a candidate target PSCell, of the multiple candidate target PSCells, that is to be accessed by the UE.

The transmission component 1104 may transmit an indication that a corresponding SCG configuration associated with a candidate target PSCell is the delta SCG configuration with respect to the base SCG configuration.

The transmission component 1104 may transmit one or more indications indicating whether at least one of the UE, a source DU, or a target DU is to maintain one or more lower layer triggered PSCell addition or change configurations and associated radio resources following performance of the PSCell addition or change procedure.

The transmission component 1104 may transmit, to at least one of the UE, a source DU, or a target DU, one or more modified lower layer triggered PSCell addition or change configurations following performance of the PSCell addition or change procedure.

The reception component 1102 may receive another measurement report indicating other beam-level measurements and other cell-level measurements associated with the multiple candidate target PSCells.

The identification component 1108 may identify, based at least in part on a combination of the other beam-level measurements and the other cell-level measurements, that the UE is to perform a subsequent PSCell change procedure.

The transmission component 1104 may transmit, via lower layer signaling, a PSCell change command indicating another candidate target PSCell, of the multiple candidate target PSCells, that is to be accessed by the UE.

The transmission component 1104 may transmit, from a DU associated with the network node to a CU associated with the network node, a message indicating the cell-level measurements associated with the multiple candidate target PSCells.

The transmission component 1104 may transmit, to another network node, a message indicating the cell-level measurements associated with the multiple candidate target PSCells.

The transmission component 1104 may transmit a candidate target PSCell preparation message, wherein the candidate target PSCell preparation message indicates at least one of a list of candidate target PSCells or a base SCG configuration.

The reception component 1102 may receive a candidate target PSCell preparation message response, wherein the candidate target PSCell preparation message response indicates a list of accepted candidate target PSCells and, for each accepted candidate target PSCell, a corresponding lower layer SCG configuration.

The transmission component 1104 may transmit a reconfiguration message, wherein the reconfiguration message indicates at least one of a list of the multiple candidate target PSCells, a base SCG configuration, or a corresponding SCG configuration associated with each of the multiple candidate target PSCells.

The transmission component 1104 and/or the determination component 1110 may cease to transmit data to the UE based at least in part on at least one of transmitting the PSCell addition or change command or receiving an acknowledgement message in response to transmitting the PSCell addition or change command.

The transmission component 1104 may transmit an indication to stop transmitting data and signaling messages over a source secondary cell group to the UE based at least in part on the at least one of transmitting the PSCell addition or change command or receiving the acknowledgement message in response to transmitting the PSCell addition or change command.

The transmission component 1104 may transmit, from a CU associated with the network node to a DU associated with the network node, an indication of at least one of whether to maintain a source PSCell configuration and associated radio resources, or whether to maintain the lower layer triggered PSCell addition or change configuration and associated radio resources for each of the multiple candidate PSCells.

The transmission component 1104 may transmit, to another network node, an indication of the candidate target PSCell that is to be accessed by the UE.

The transmission component 1104 may transmit, to another network node, a message indicating at least one of a secondary node release request, or an address of a network node associated with the candidate target PSCell that is to be accessed by the UE.

The transmission component 1104 may transmit an indication that the PSCell addition or change command was transmitted.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving configuration information indicating, for each of multiple candidate target PSCells, a lower layer triggered PSCell addition or change configuration; transmitting a measurement report indicating beam-level measurements and cell-level measurements associated with the multiple candidate target PSCells; receiving, via lower layer signaling and based at least in part on a combination of the beam-level measurements and the cell-level measurements, a PSCell addition or change command indicating a candidate target PSCell, of the multiple candidate target PSCells, that is to be accessed; and performing, based at least in part on receiving the PSCell addition or change command, a PSCell addition or change procedure associated with the candidate target PSCell based at least in part on a corresponding lower layer triggered PSCell addition or change configuration for the candidate target PSCell.

Aspect 2: The method of Aspect 1, wherein the PSCell addition or change procedure includes changing a PSCell from a first cell associated with an SN to a second cell associated with the SN, wherein the second cell is the candidate target PSCell.

Aspect 3: The method of Aspect 1, wherein the PSCell addition or change procedure includes changing a PSCell from a first cell associated with a first SN to a second cell associated with a second SN, wherein the second cell is the candidate target PSCell.

Aspect 4: The method of Aspect 1, wherein the PSCell addition or change procedure includes adding a PSCell from a cell associated with a secondary node (SN), wherein the cell is the candidate target PSCell.

Aspect 5: The method of any of Aspects 1-4, wherein the multiple candidate target PSCells are associated with a DU associated with an SN.

Aspect 6: The method of any of Aspects 1-4, wherein at least a first candidate target PSCell, of the multiple candidate target PSCells, is associated with a first DU associated with an SN, and wherein at least a second candidate target PSCell, of the multiple candidate target PSCells, is associated with a second DU associated with the SN.

Aspect 7: The method of any of Aspects 1-6, wherein the configuration information indicates at least one of: a list of the multiple candidate target PSCells, a base SCG configuration, or for each candidate target PSCell, of the multiple candidate target PSCells, a corresponding SCG configuration.

Aspect 8: The method of any of Aspects 1-7, wherein the configuration information indicates a base SCG configuration, and, for each candidate target PSCell, of the multiple candidate target PSCells, a delta SCG configuration with respect to the base SCG configuration.

Aspect 9: The method of Aspect 8, further comprising receiving an indication that a corresponding SCG configuration associated with a candidate target PSCell is the delta SCG configuration with respect to the base SCG configuration.

Aspect 10: The method of any of Aspects 1-9, wherein the configuration information is received from a secondary node via an SRB3.

Aspect 11: The method of any of Aspects 1-9, wherein the configuration information is received from a master node via an SRB1.

Aspect 12: The method of any of Aspects 1-11, further comprising receiving an indication whether to maintain one or more lower layer triggered PSCell addition or change configurations and associated radio resources following performance of the PSCell addition or change procedure.

Aspect 13: The method of Aspect 12, wherein the indication whether to maintain the one or more lower layer triggered PSCell addition or change configurations is received via one of a DCI communication, a MAC-CE communication, or an RRC communication.

Aspect 14: The method of any of Aspects 1-13, further comprising receiving one or more modified lower layer triggered PSCell addition or change configurations following performance of the PSCell addition or change procedure.

Aspect 15: The method of any of Aspects 1-14, wherein transmitting the measurement report is based at least in part on one or more event triggers being satisfied.

Aspect 16: The method of Aspect 15, wherein the one or more event triggers are based at least in part on at least one of L1 measurements or L3 measurements.

Aspect 17: The method of any of Aspects 1-16, further comprising: transmitting another measurement report indicating other beam-level measurements and other cell-level measurements associated with the multiple candidate target PSCells; receiving, via lower layer signaling and based at least in part on a combination of the other beam-level measurements and the other cell-level measurements, a PSCell change command indicating an other candidate target PSCell, of the multiple candidate target PSCells, that is to be accessed; and performing, based at least in part on receiving the PSCell change command, a subsequent PSCell change procedure based at least in part on a corresponding lower layer triggered PSCell addition or change configuration for the other candidate target PSCell.

Aspect 18: A method of wireless communication performed by a network node, comprising: transmitting configuration information indicating, for each of multiple candidate target PSCells, a lower layer triggered PSCell addition or change configuration; receiving a measurement report indicating beam-level measurements and cell-level measurements associated with the multiple candidate target PSCells; identifying, based at least in part on a combination of the beam-level measurements and the cell-level measurements, that a UE is to perform a PSCell addition or change procedure; and transmitting, via lower layer signaling, a PSCell addition or change command indicating a candidate target PSCell, of the multiple candidate target PSCells, that is to be accessed by the UE.

Aspect 19: The method of Aspect 18, wherein the network node an SN, and wherein the PSCell addition or change procedure includes changing a PSCell from a first cell associated with the SN to a second cell associated with the SN, wherein the second cell is the candidate target PSCell.

Aspect 20: The method of Aspect 18, wherein the network node is a master node or an SN, and wherein the PSCell addition or change procedure includes changing a PSCell from a first cell associated with a first SN to a second cell associated with a second SN, wherein the second cell is the candidate target PSCell.

Aspect 21: The method of Aspect 18, wherein the PSCell addition or change procedure includes adding a PSCell from a cell associated with a secondary node (SN), wherein the cell is the candidate target PSCell.

Aspect 22: The method of any of Aspects 18-21, wherein the multiple candidate target PSCells are associated with a DU associated with an SN.

Aspect 23: The method of any of Aspects 18-21, wherein at least a first candidate target PSCell, of the multiple candidate target PSCells, is associated with a first DU associated with an SN, and wherein at least a second candidate target PSCell, of the multiple candidate target PSCells, is associated with a second DU associated with the SN.

Aspect 24: The method of any of Aspects 18-23, wherein the configuration information indicates at least one of: a list of the multiple candidate target PSCells, a base SCG configuration, or for each candidate target PSCell, of the multiple candidate target PSCells, a corresponding SCG configuration.

Aspect 25: The method of any of Aspects 18-23, wherein the configuration information indicates a base SCG configuration, and, for each candidate target PSCell, of the multiple candidate target PSCells, a delta SCG configuration with respect to the base SCG configuration.

Aspect 26: The method of Aspect 24, further comprising transmitting an indication that a corresponding SCG configuration associated with a candidate target PSCell is the delta SCG configuration with respect to the base SCG configuration.

Aspect 27: The method of any of Aspects 18-26, wherein the network node is a secondary node, and wherein the configuration information is transmitted via an SRB3.

Aspect 28: The method of any of Aspects 18-26, wherein the network node is a secondary node, and wherein the configuration information is transmitted via a master node and via an SRB1.

Aspect 29: The method of any of Aspects 18-28, further comprising transmitting one or more indications indicating whether at least one of the UE, a source DU, or a target DU is to maintain one or more lower layer triggered PSCell addition or change configurations and associated radio resources following performance of the PSCell addition or change procedure.

Aspect 30: The method of Aspect 29, wherein the indication indicating whether the UE is to maintain one or more lower layer triggered PSCell addition or change configurations is transmitted via one of a DCI communication, a MAC-CE communication, or an RRC communication.

Aspect 31: The method of any of Aspects 18-30, further comprising transmitting, to at least one of the UE, a source DU, or a target DU, one or more modified lower layer triggered PSCell addition or change configurations following performance of the PSCell addition or change procedure.

Aspect 32: The method of any of Aspects 18-31, further comprising: receiving another measurement report indicating other beam-level measurements and other cell-level measurements associated with the multiple candidate target PSCells; identifying, based at least in part on a combination of the other beam-level measurements and the other cell-level measurements, that the UE is to perform a subsequent PSCell change procedure; and transmitting, via lower layer signaling, a PSCell change command indicating another candidate target PSCell, of the multiple candidate target PSCells, that is to be accessed by the UE.

Aspect 33: The method of any of Aspects 18-32, further comprising transmitting, from a DU associated with the network node to a CU associated with the network node, a message indicating the cell-level measurements associated with the multiple candidate target PSCells.

Aspect 34: The method of any of Aspects 18-33, further comprising transmitting, to another network node, a message indicating the cell-level measurements associated with the multiple candidate target PSCells.

Aspect 35: The method of any of Aspects 18-34, further comprising transmitting, by a CU associated with the network node to a DU associated with the network node, a candidate target PSCell preparation message, wherein the candidate target PSCell preparation message indicates at least one of a list of candidate target PSCells or a base SCG configuration.

Aspect 36: The method of Aspect 35, further comprising receiving, by the CU associated with the network node from the DU associated with the network node, a candidate target PSCell preparation message response, wherein the candidate target PSCell preparation message response indicates a list of accepted candidate target PSCells and, for each accepted candidate target PSCell, a corresponding lower layer SCG configuration.

Aspect 37: The method of Aspect 36, wherein the corresponding lower layer SCG configuration for each accepted candidate target PSCell is associated with a delta configuration with respect to the base SCG configuration, and wherein the candidate target PSCell preparation message response includes, for each accepted candidate target PSCell, an indication that the candidate target PSCell preparation message response includes the delta configuration for the accepted candidate target SCG.

Aspect 38: The method of any of Aspects 18-37, further comprising transmitting, by a CU associated with the network node to a DU associated with the network node, a reconfiguration message, wherein the reconfiguration message indicates at least one of a list of the multiple candidate target PSCells, a base SCG configuration, or a corresponding SCG configuration associated with each of the multiple candidate target PSCells.

Aspect 39: The method of Aspect 38, wherein the corresponding SCG configuration associated with each of the multiple candidate target PSCells is a delta configuration with respect to the base SCG configuration, and wherein the reconfiguration message includes, for each of the multiple candidate target PSCells, an indication that the reconfiguration message includes the delta configuration for the candidate target PSCell.

Aspect 40: The method of any of Aspects 18-39, further comprising ceasing to transmit data to the UE based at least in part on at least one of transmitting the PSCell addition or change command or receiving an acknowledgement message in response to transmitting the PSCell addition or change command.

Aspect 41: The method of Aspect 40, further comprising transmitting, by a DU associated with the network node to a CU associated with the network node, an indication to stop transmitting data and signaling messages over a source secondary cell group to the UE based at least in part on the at least one of transmitting the PSCell addition or change command or receiving the acknowledgement message in response to transmitting the PSCell addition or change command.

Aspect 42: The method of any of Aspects 18-41, further comprising transmitting, from a CU associated with the network node to a DU associated with the network node, an indication of at least one of whether to maintain a source PSCell configuration and associated radio resources, or whether to maintain the lower layer triggered PSCell addition or change configuration and associated radio resources for each of the multiple candidate PSCells.

Aspect 43: The method of any of Aspects 18-42, further comprising transmitting, to another network node, an indication of the candidate target PSCell that is to be accessed by the UE.

Aspect 44: The method of any of Aspects 18-43, further comprising transmitting, to another network node, a message indicating at least one of a secondary node release request, or an address of a network node associated with the candidate target PSCell that is to be accessed by the UE.

Aspect 45: The method of Aspect 44, wherein the message indicating the at least one of the secondary node release request, or the address of the network node associated with the candidate target PSCell that is to be accessed by the UE, is transmitted based at least in part on receiving, from the UE, a reconfiguration complete message.

Aspect 46: The method of any of Aspects 18-45, further comprising transmitting, by a DU associated with the network node to a CU associated with the network node, an indication that the PSCell addition or change command was transmitted.

Aspect 47: An apparatus for wireless communication at a device, comprising a processor; memory coupled with the processor; and instructions stored in the memory and executable by the processor to cause the apparatus to perform the method of one or more of Aspects 1-46.

Aspect 48: A device for wireless communication, comprising a memory and one or more processors coupled to the memory, the one or more processors configured to perform the method of one or more of Aspects 1-46.

Aspect 49: An apparatus for wireless communication, comprising at least one means for performing the method of one or more of Aspects 1-46.

Aspect 50: A non-transitory computer-readable medium storing code for wireless communication, the code comprising instructions executable by a processor to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a transceiver;

one or more memories; and one or more processors, coupled to the transceiver and the one or more memories, configured to:

receive, via the transceiver, configuration information indicating, for each of multiple candidate target primary secondary cells (PSCells), a lower layer triggered PSCell addition or change configuration, wherein the configuration information indicates a base secondary cell group (SCG) configuration, and, for each candidate target PSCell, of the multiple candidate target PSCells, a delta SCG configuration with respect to the base SCG configuration;

receive, via the transceiver, an indication that a corresponding SCG configuration associated with a candidate target PSCell is the delta SCG configuration with respect to the base SCG configuration;

transmit, via the transceiver, a measurement report indicating beam-level measurements and cell-level measurements associated with the multiple candidate target PSCells;

receive, via the transceiver, via lower layer signaling, and based at least in part on a combination of the beam-level measurements and the cell-level measurements, a PSCell addition or change command indicating a candidate target PSCell, of the multiple candidate target PSCells, that is to be accessed; and perform, based at least in part on receiving the PSCell addition or change command, a PSCell addition or change procedure associated with the candidate target PSCell based at least in part on a corresponding lower layer triggered PSCell addition or change configuration for the candidate target PSCell.

2. The UE of claim 1, wherein the PSCell addition or change procedure includes changing a PSCell from a first cell associated with a secondary node (SN) to a second cell associated with the SN, wherein the second cell is the candidate target PSCell.

3. The UE of claim 1, wherein the PSCell addition or change procedure includes changing a PSCell from a first cell associated with a first secondary node (SN) to a second cell associated with a second SN, wherein the second cell is the candidate target PSCell.

4. The UE of claim 1, wherein the PSCell addition or change procedure includes adding a PSCell from a cell associated with a secondary node (SN), wherein the cell is the candidate target PSCell.

5. The UE of claim 1, wherein the multiple candidate target PSCells are associated with a distributed unit (DU) associated with a secondary node (SN).

6. The UE of claim 1, wherein at least a first candidate target PSCell, of the multiple candidate target PSCells, is associated with a first distributed unit (DU) associated with a secondary node (SN), and wherein at least a second candidate target PSCell, of the multiple candidate target PSCells, is associated with a second DU associated with the SN.

7. The UE of claim 1, wherein the configuration information further indicates at least one of:

a list of the multiple candidate target PSCells, or for each candidate target PSCell, of the multiple candidate target PSCells, a corresponding SCG configuration.

8. The UE of claim 1, wherein the configuration information is received from a secondary node via a signaling radio bearer 3 (SRB3).

9. The UE of claim 1, wherein the configuration information is received from a master node via a signaling radio bearer 1 (SRB1).

10. The UE of claim 1, wherein the one or more processors are further configured to receive, via the transceiver, an indication whether to maintain one or more lower layer triggered PSCell addition or change configurations and associated radio resources following performance of the PSCell addition or change procedure, and wherein the indication whether to maintain the one or more lower layer triggered PSCell addition or change configurations is received via one of a downlink control information (DCI) communication, a medium access control (MAC) control element (MAC-CE) communication, or a radio resource control (RRC) communication.

11. The UE of claim 1, wherein the one or more processors are further configured to receive, via the transceiver, one or more modified lower layer triggered PSCell addition or change configurations following performance of the PSCell addition or change procedure.

12. The UE of claim 1, wherein transmitting the measurement report is based at least in part on one or more event triggers being satisfied.

13. The UE of claim 12, wherein the one or more event triggers are based at least in part on at least one of layer 1 (L1) measurements or layer 3 (L3) measurements.

14. The UE of claim 1, wherein the one or more processors are further configured to:

transmit, via the transceiver, another measurement report indicating other beam-level measurements and other cell-level measurements associated with the multiple candidate target PSCells;

receive, via the transceiver, via lower layer signaling, and based at least in part on a combination of the other beam-level measurements and the other cell-level measurements, a PSCell change command indicating an other candidate target PSCell, of the multiple candidate target PSCells, that is to be accessed; and perform, based at least in part on receiving the PSCell change command, a subsequent PSCell change procedure based at least in part on a corresponding lower layer triggered PSCell addition or change configuration for the other candidate target PSCell.

15. A network node for wireless communication, comprising:

one or more memories; and one or more processors, coupled to the one or more memories, configured to:

transmit configuration information indicating, for each of multiple candidate target primary secondary cells (PSCells), a lower layer triggered PSCell addition or change configuration, wherein the configuration information indicates a base secondary cell group (SCG) configuration, and, for each candidate target PSCell, of the multiple candidate target PSCells, a delta SCG configuration with respect to the base SCG configuration;

transmit an indication that a corresponding SCG configuration associated with a candidate target PSCell is the delta SCG configuration with respect to the base SCG configuration;

receive a measurement report indicating beam-level measurements and cell-level measurements associated with the multiple candidate target PSCells;

identify, based at least in part on a combination of the beam-level measurements and the cell-level measurements, that a user equipment (UE) is to perform a PSCell addition or change procedure; and transmit, via lower layer signaling, a PSCell addition or change command indicating a candidate target PSCell, of the multiple candidate target PSCells, that is to be accessed by the UE.

16. The network node of claim 15, wherein the network node is a secondary node (SN), wherein the PSCell addition or change procedure includes changing a PSCell from a first cell associated with the SN to a second cell associated with the SN, wherein the second cell is the candidate target PSCell, and wherein the multiple candidate target PSCells are associated with a distributed unit (DU) associated with the SN.

17. The network node of claim 15, wherein the network node is a master node or a secondary node (SN), wherein the PSCell addition or change procedure includes changing a PSCell from a first cell associated with a first SN to a second cell associated with a second SN, wherein the second cell is the candidate target PSCell, wherein at least a first candidate target PSCell, of the multiple candidate target PSCells, is associated with a first distributed unit (DU) associated with the SN, and wherein at least a second candidate target PSCell, of the multiple candidate target PSCells, is associated with a second DU associated with the SN.

18. The network node of claim 15, wherein the one or more processors are further configured to transmit, by a centralized unit (CU) associated with the network node to a distributed unit (DU) associated with the network node, a candidate target PSCell preparation message, wherein the candidate target PSCell preparation message indicates a list of candidate target PSCells.

19. The network node of claim 18, wherein the one or more processors are further configured to receive, by the CU associated with the network node from the DU associated with the network node, a candidate target PSCell preparation message response, wherein the candidate target PSCell preparation message response indicates a list of accepted candidate target PSCells and, for each accepted candidate target PSCell, a corresponding lower layer SCG configuration.

20. The network node of claim 19, wherein the corresponding lower layer SCG configuration for each accepted candidate target PSCell is associated with a delta configuration with respect to the base SCG configuration, and wherein the candidate target PSCell preparation message response includes, for each accepted candidate target PSCell, an indication that the candidate target PSCell preparation message response includes the delta configuration for the accepted candidate target SCG.

21. The network node of claim 15, wherein the one or more processors are further configured to transmit, by a centralized unit (CU) associated with the network node to a distributed unit (DU) associated with the network node, a reconfiguration message, wherein the reconfiguration message indicates at least one of a list of the multiple candidate target PSCells, a base secondary cell group (SCG) configuration, or a corresponding SCG configuration associated with each of the multiple candidate target PSCells.

22. The network node of claim 21, wherein the corresponding SCG configuration associated with each of the multiple candidate target PSCells is a delta configuration with respect to the base SCG configuration, and wherein the reconfiguration message includes, for each of the multiple candidate target PSCells, an indication that the reconfiguration message includes the delta configuration for the candidate target PSCell.

23. The network node of claim 15, wherein the one or more processors are further configured to:

cease to transmit data to the UE based at least in part on at least one of transmitting the PSCell addition or change command or receiving an acknowledgement message in response to transmitting the PSCell addition or change command; and transmit, by a distributed unit (DU) associated with the network node to a centralized unit (CU) associated with the network node, an indication to stop transmitting data and signaling messages over a source secondary cell group to the UE based at least in part on the at least one of transmitting the PSCell addition or change command or receiving the acknowledgement message in response to transmitting the PSCell addition or change command.

24. The network node of claim 15, wherein the one or more processors are further configured to transmit, from a centralized unit (CU) associated with the network node to a distributed unit (DU) associated with the network node, an indication of at least one of whether to maintain a source PSCell configuration and associated radio resources, or whether to maintain the lower layer triggered PSCell addition or change configuration and associated radio resources for each of the multiple candidate PSCells.

25. The network node of claim 15, wherein the one or more processors are further configured to transmit, to another network node, an indication of the candidate target PSCell that is to be accessed by the UE.

26. The network node of claim 15, wherein the one or more processors are further configured to transmit, to another network node, a message indicating at least one of a secondary node release request, or an address of a network node associated with the candidate target PSCell that is to be accessed by the UE, and wherein the message indicating the at least one of the secondary node release request, or the address of the network node associated with the candidate target PSCell that is to be accessed by the UE, is transmitted based at least in part on receiving, from the UE, a reconfiguration complete message.

27. The network node of claim 15, wherein the one or more processors are further configured to transmit, by a distributed unit (DU) associated with the network node to a centralized unit (CU) associated with the network node, an indication that the PSCell addition or change command was transmitted.

28. A method of wireless communication performed by a user equipment (UE), comprising:

receiving configuration information indicating, for each of multiple candidate target primary secondary cells (PSCells), a lower layer triggered PSCell addition or change configuration, wherein the configuration information indicates a base secondary cell group (SCG) configuration, and, for each candidate target PSCell, of the multiple candidate target PSCells, a delta SCG configuration with respect to the base SCG configuration;

receiving an indication that a corresponding SCG configuration associated with a candidate target PSCell is the delta SCG configuration with respect to the base SCG configuration;

transmitting a measurement report indicating beam-level measurements and cell-level measurements associated with the multiple candidate target PSCells;

receiving, via lower layer signaling and based at least in part on a combination of the beam-level measurements and the cell-level measurements, a PSCell addition or change command indicating a candidate target PSCell, of the multiple candidate target PSCells, that is to be accessed; and performing, based at least in part on receiving the PSCell addition or change command, a PSCell addition or change procedure associated with the candidate target PSCell based at least in part on a corresponding lower layer triggered PSCell addition or change configuration for the candidate target PSCell.

29. A method of wireless communication performed by a network node, comprising:

transmitting configuration information indicating, for each of multiple candidate target primary secondary cells (PSCells), a lower layer triggered PSCell addition or change configuration, wherein the configuration information indicates a base secondary cell group (SCG) configuration, and, for each candidate target PSCell, of the multiple candidate target PSCells, a delta SCG configuration with respect to the base SCG configuration;

transmitting an indication that a corresponding SCG configuration associated with a candidate target PSCell is the delta SCG configuration with respect to the base SCG configuration;

receiving a measurement report indicating beam-level measurements and cell-level measurements associated with the multiple candidate target PSCells;

identifying, based at least in part on a combination of the beam-level measurements and the cell-level measurements, that a user equipment (UE) is to perform a PSCell addition or change procedure; and transmitting, via lower layer signaling, a PSCell addition or change command indicating a candidate target PSCell, of the multiple candidate target PSCells, that is to be accessed by the UE.

30. The network node of claim 15, wherein receiving the measurement report is based at least in part on one or more event triggers being satisfied.

* * * * *